US011309666B2

(12) United States Patent
Opferman

(10) Patent No.: US 11,309,666 B2
(45) Date of Patent: Apr. 19, 2022

(54) METHOD AND SYSTEM FOR IMPLEMENTING MEDIA ADAPTATION DEVICE FUNCTIONALITY

(71) Applicant: CenturyLink Intellectual Property LLC, Broomfield, CO (US)

(72) Inventor: Stephen Opferman, Denver, CO (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 439 days.

(21) Appl. No.: 16/447,755

(22) Filed: Jun. 20, 2019

(65) Prior Publication Data

US 2020/0335917 A1    Oct. 22, 2020

Related U.S. Application Data

(60) Provisional application No. 62/834,536, filed on Apr. 16, 2019.

(51) Int. Cl.
*H01R 13/70* (2006.01)
*H04W 4/50* (2018.01)
(Continued)

(52) U.S. Cl.
CPC .......... *H01R 13/701* (2013.01); *G06F 3/013* (2013.01); *G06F 9/542* (2013.01); *H04L 67/12* (2013.01); *H04W 4/50* (2018.02)

(58) Field of Classification Search
CPC .......... H04W 4/50; H04L 67/12; G06F 3/013; G06F 9/542
See application file for complete search history.

(56) References Cited

U.S. PATENT DOCUMENTS

2010/0056260 A1* 3/2010 Fujimoto ............ G07F 17/3244
463/25
2010/0114706 A1* 5/2010 Kosuru ................. G06Q 30/02
705/14.55
(Continued)

FOREIGN PATENT DOCUMENTS

WO     WO-2014105114 A1 *   7/2014   ........... H04L 9/3239

OTHER PUBLICATIONS

Samara Lynn, "Amped Wireless Tap-Ex High Power Touch Screen Wi-Fi Range Extender Review", published on Nov. 12, 2014 to https://www.pcmag.com/reviews/amped-wireless-tap-ex-high-power-touch-screen-wi-fi-range-extender, retrieved Nov. 4, 2021 (Year: 2014).*

(Continued)

*Primary Examiner* — Shourjo Dasgupta
(74) *Attorney, Agent, or Firm* — Lumen Patent Firm

(57) ABSTRACT

Novel tools and techniques are provided for implementing customer premises device functionality, and, more particularly, to methods, systems, and apparatuses for implementing media adaptation device functionality. In various embodiment, a rear-facing camera of a media adaptation device might capture a first image of a wall of a customer premises, the wall including an electrical wall outlet into which the media adaptation device is intended to be plugged. The media adaptation device might display, on a front display device disposed on a front face (and in some cases, also on top and/or side display devices on corresponding faces) of the media adaptation device, a second image based on the captured first image of the wall of the customer premises. The media adaptation device might also perform one or more first functions other than display of images or videos, after the media adaptation device has been plugged into the electrical wall outlet.

16 Claims, 12 Drawing Sheets

(51) Int. Cl.
*H04L 67/12* (2022.01)
*G06F 3/01* (2006.01)
*G06F 9/54* (2006.01)

(56) References Cited

U.S. PATENT DOCUMENTS

| | | | | |
|---|---|---|---|---|
| 2014/0005809 | A1* | 1/2014 | Frei | H04L 43/10 |
| | | | | 700/90 |
| 2014/0279047 | A1* | 9/2014 | Wang | G06Q 30/0269 |
| | | | | 705/14.66 |
| 2015/0229819 | A1* | 8/2015 | Rivard | H04N 5/2256 |
| | | | | 348/362 |
| 2015/0324332 | A1* | 11/2015 | Perret | H04W 4/30 |
| | | | | 715/234 |
| 2017/0364722 | A1* | 12/2017 | Todeschini | G06K 9/2081 |
| 2018/0293608 | A1* | 10/2018 | Li | G06Q 30/0246 |
| 2019/0312774 | A1* | 10/2019 | Lehman | G06K 9/78 |
| 2019/0369850 | A1* | 12/2019 | Roy | G06F 3/04815 |

OTHER PUBLICATIONS

John R. Delaney, "TP-Link AC1900 Touch Screen Wi-Fi Gigabit Router Touch P5 Review", published on Apr. 22, 2016 to https://www.pcmag.com/reviews/tp-link-ac1900-touch-screen-wi-fi-gigabit-router-touch-p5, retrieved Nov. 4, 2021 (Year: 2016).*

Securifi, "Almond 3 Smart Home Wi-Fi system", published on Nov. 18, 2016 to https://www.thesource.ca/download/EN/108064198_Datasheet.pdf, retrieved Nov. 4, 2021 (Year: 2016).*

Dan Gookin, "How to Create a Mobile Hotspot with an Android Phone", published on Jun. 5, 2014 to https://www.dummies.com/consumer-electronics/smartphones/droid/how-to-create-a-mobile-hotspot-with-an-android-phone, retrieved Nov. 5, 2021 (Year: 2014).*

* cited by examiner

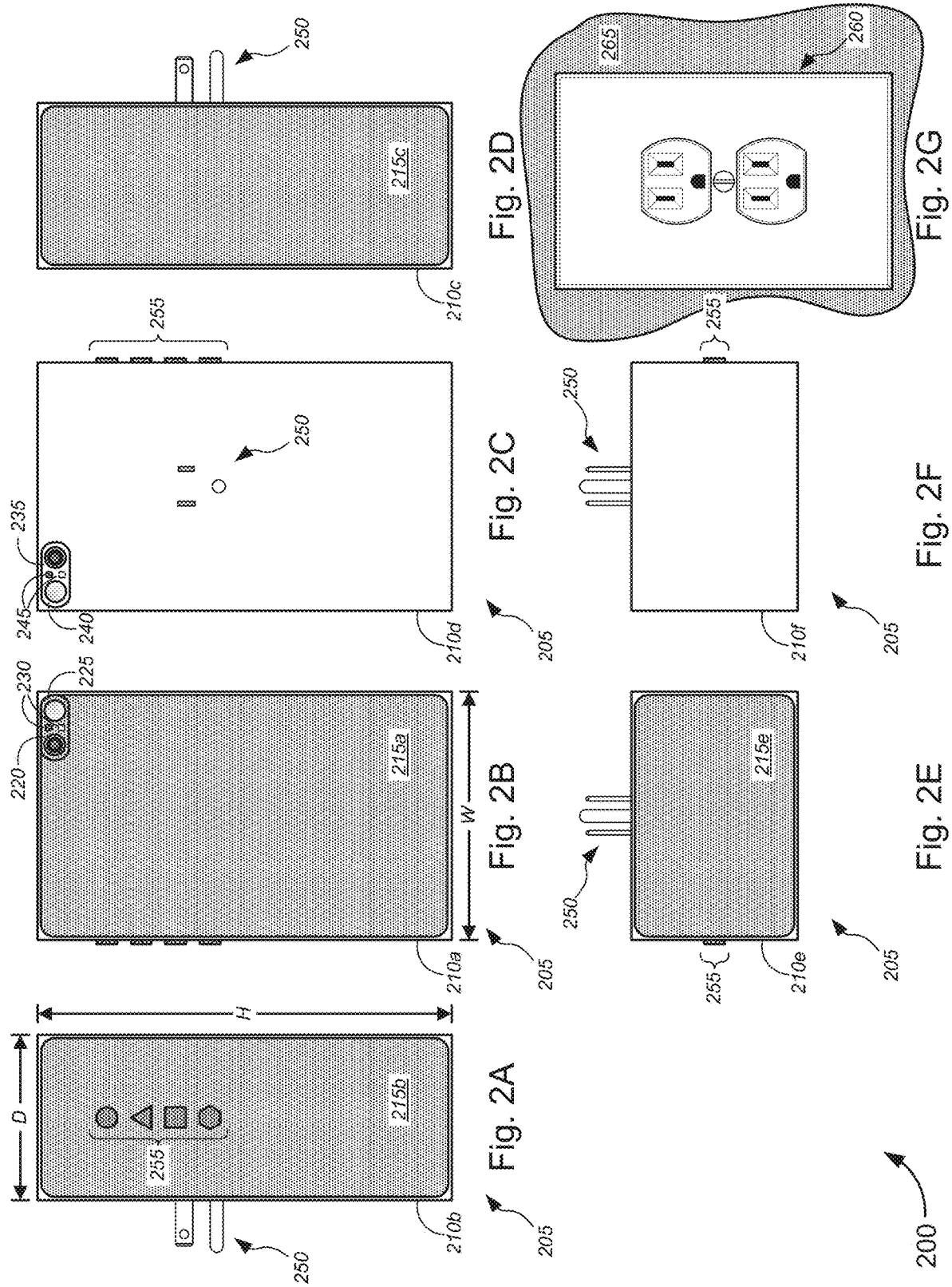

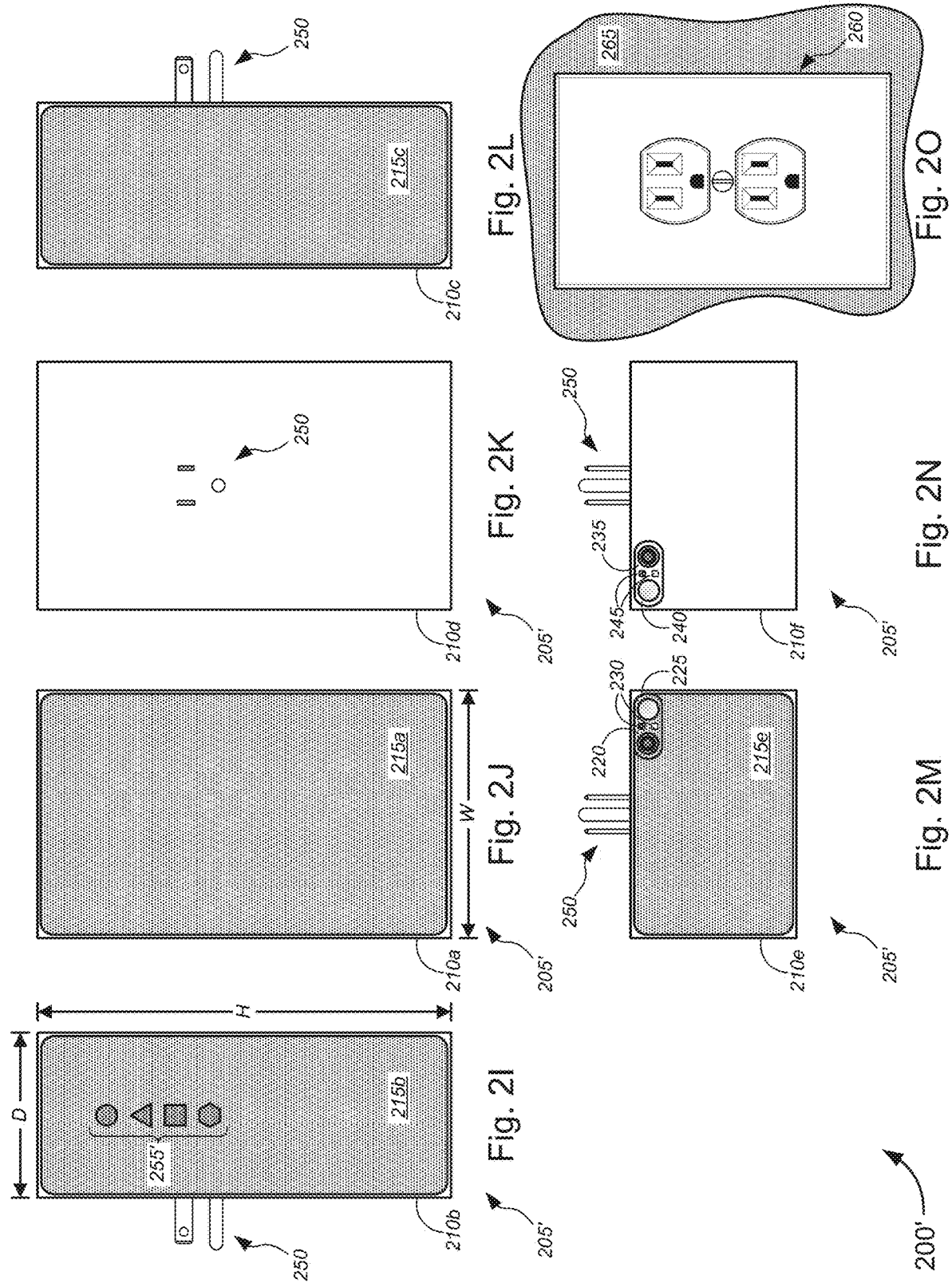

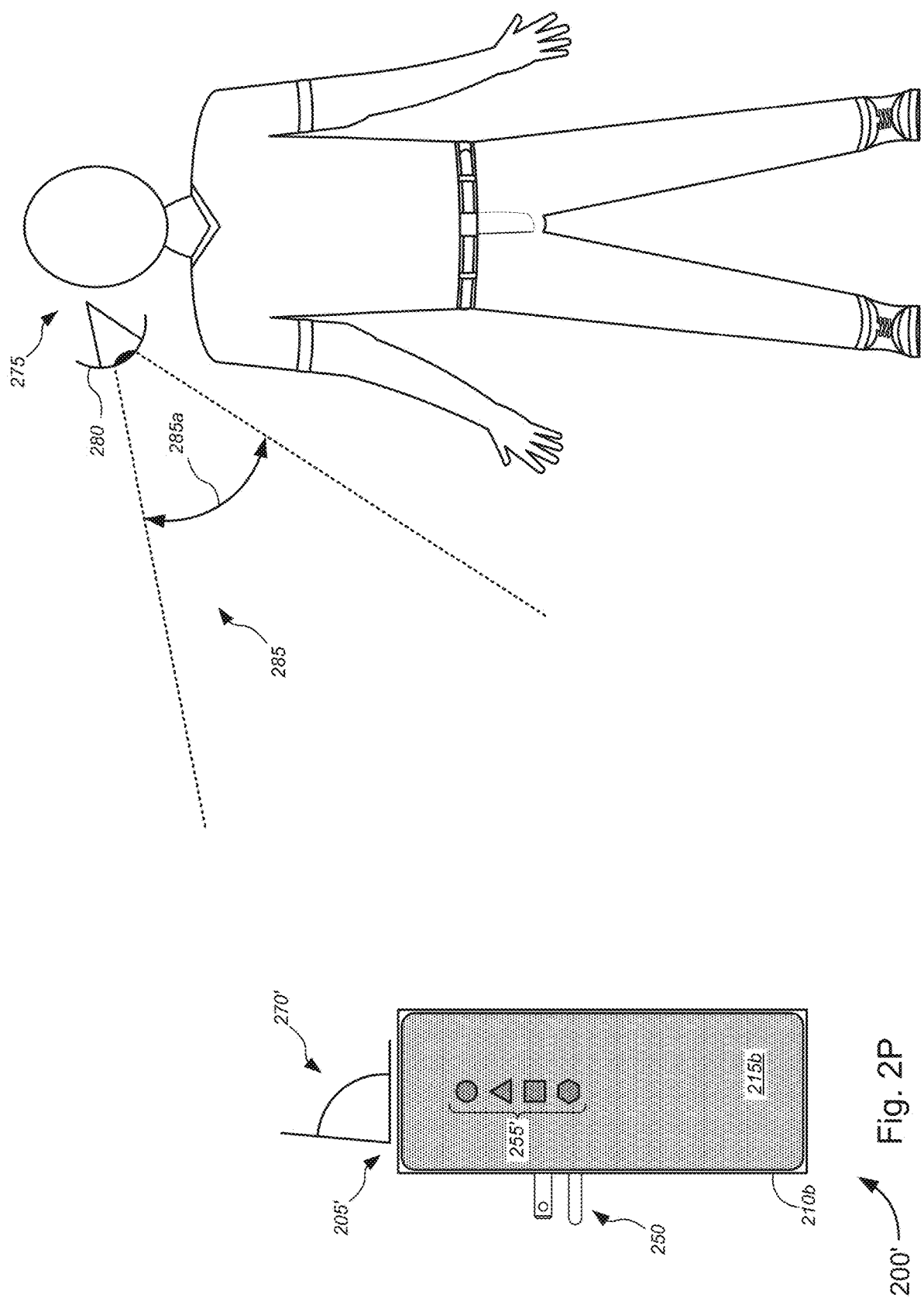

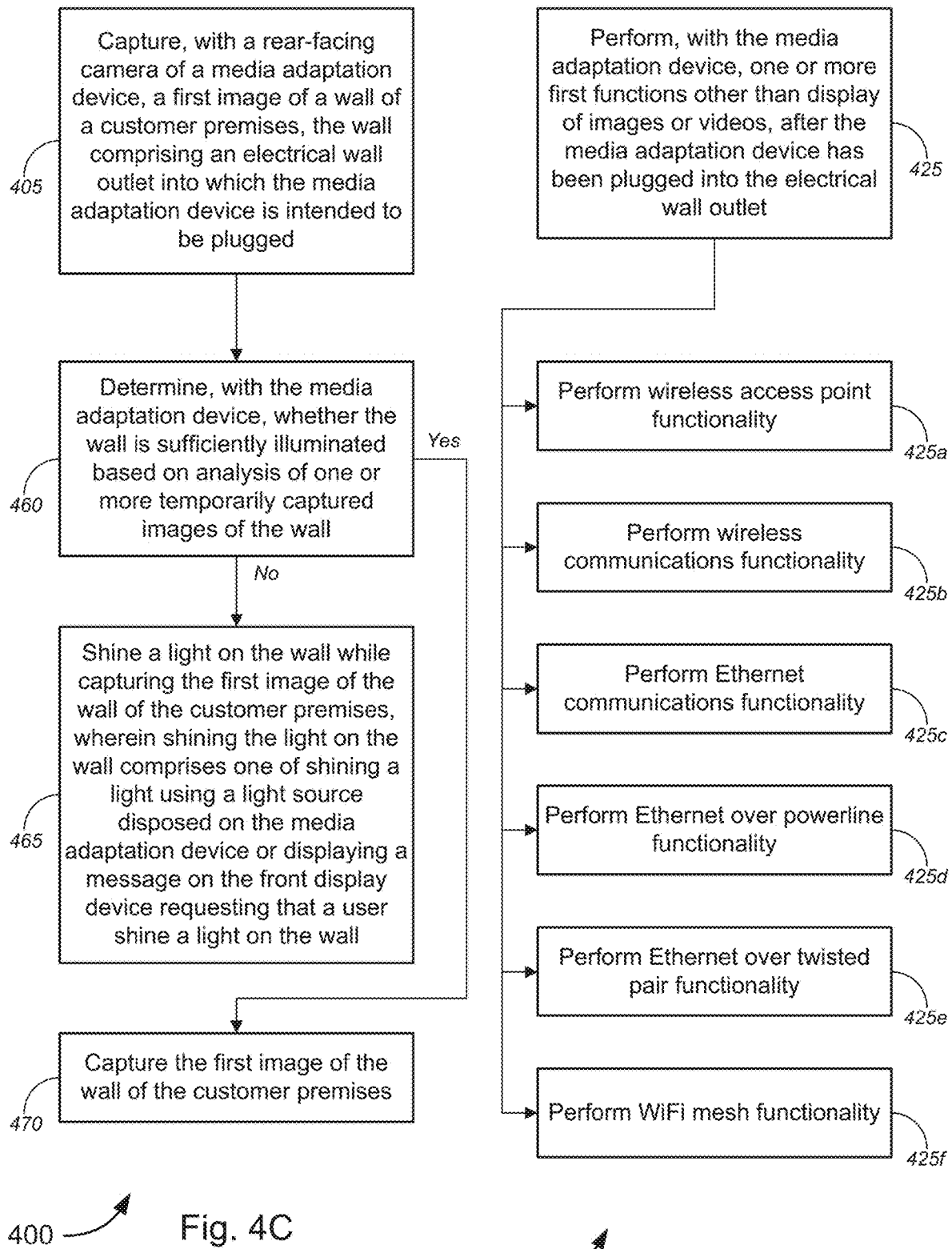

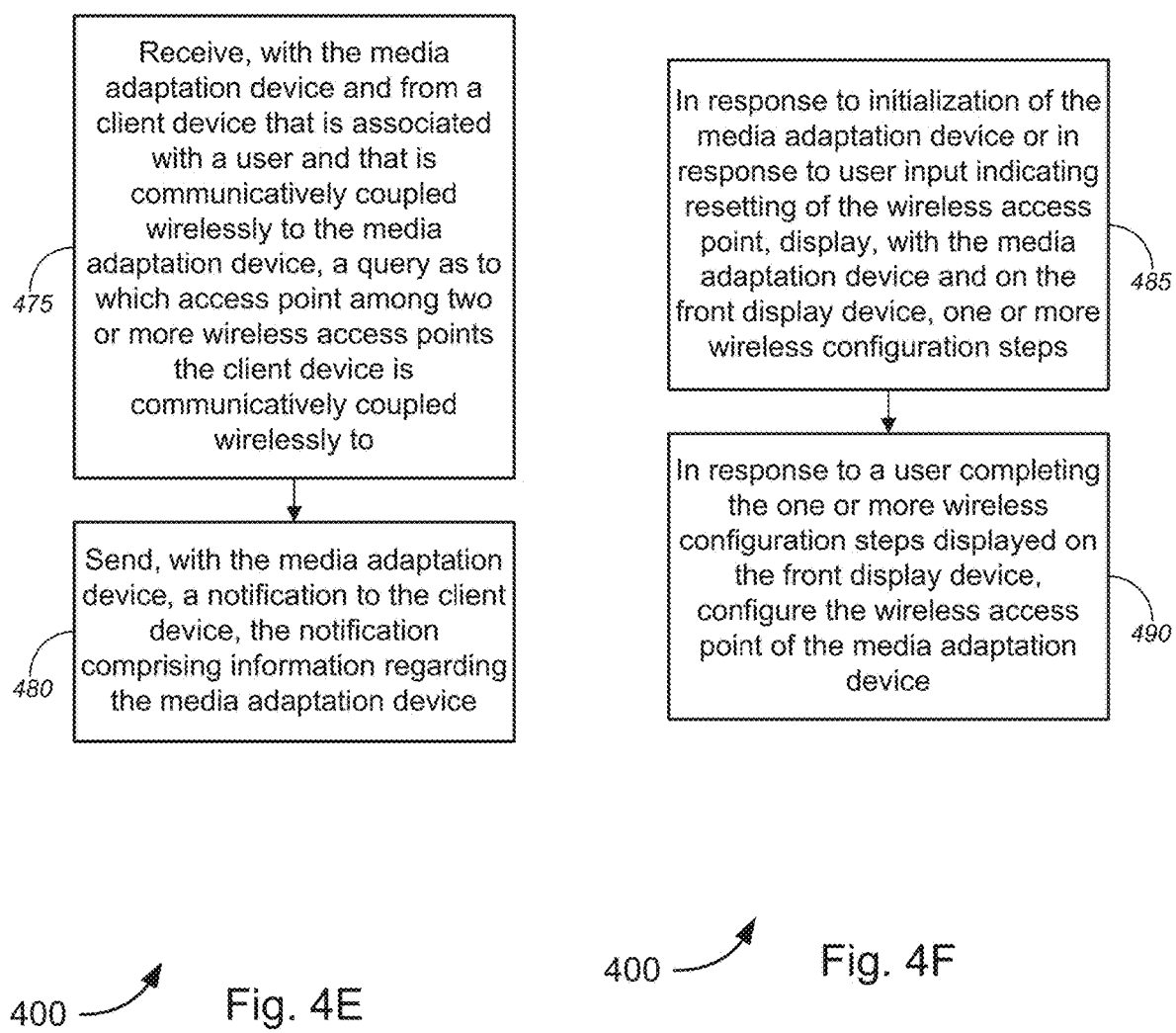

METHOD AND SYSTEM FOR IMPLEMENTING MEDIA ADAPTATION DEVICE FUNCTIONALITY

CROSS-REFERENCES TO RELATED APPLICATIONS

This application claims priority to U.S. patent application Ser. No. 62/834,536 (the "'536 Application"), filed Apr. 16, 2019 by Stephen Opferman, entitled, "Method and System for Implementing Media Adaptation Device Functionality," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing customer premises device functionality, and, more particularly, to methods, systems, and apparatuses for implementing media adaptation device functionality.

BACKGROUND

Conventional customer premises devices, such as G.hn devices, that plug into electrical wall outlets disposed on a wall of a customer premises are conventional devices that do not blend aesthetically with the wall of the customer premises. Such devices typically also do not provide user interface functionality nor do they offer the possibility of enabling display of advertising to users present at the customer premises.

Hence, there is a need for more robust and scalable solutions for implementing customer premises device functionality, and, more particularly, to methods, systems, and apparatuses for implementing media adaptation device functionality.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4F are flow diagrams illustrating a method for implementing media adaptation device functionality, in accordance with various embodiments.

DETAILED DESCRIPTION OF CERTAIN EMBODIMENTS

Overview

Figure 1:
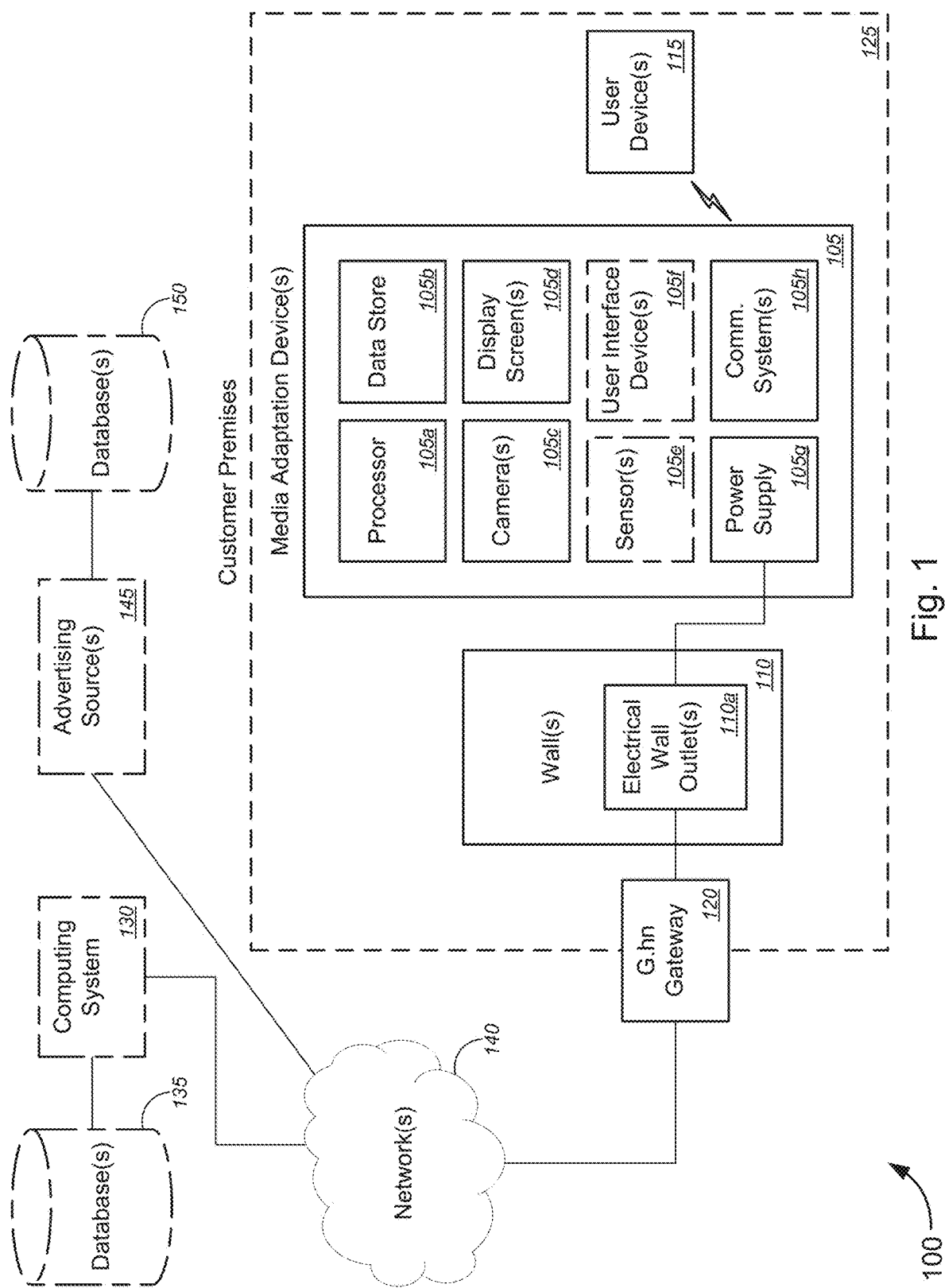
FIG. 1 is a schematic diagram illustrating a system for implementing media adaptation device functionality, in accordance with various embodiments.

Various embodiments provide tools and techniques for implementing customer premises device functionality, and, more particularly, to methods, systems, and apparatuses for implementing media adaptation device functionality.

In various embodiments, a media adaptation device might capture, using a rear-facing camera(s), a first image of a wall of the customer premises. In some cases, the rear-facing camera(s) might be disposed on at least one of a rear face of the media adaptation device, a top face of the media adaptation device, a bottom face of the media adaptation device, and/or a side face of the media adaptation device. In some cases, the media adaptation device might be directly plugged into an electrical wall outlet disposed on the wall, while the first image is being captured. Alternatively, the media adaptation device might be plugged into the electrical wall outlet disposed on the wall via an extension cord (not shown) connecting the media adaptation device to the electrical wall outlet, while the first image is being captured. In some instances, capturing the first image of the wall of the customer premises might comprise determining, with the media adaptation device, whether the wall is sufficiently illuminated based on analysis of one or more temporarily captured images of the wall; based on a determination that the wall is not sufficiently illuminated, shining a light on the wall while capturing the first image of the wall of the customer premises, wherein shining the light on the wall comprises one of shining a light using a light source disposed on the media adaptation device or displaying a message on a front display device of the media adaptation device requesting that a user shine a light on the wall; and based on a determination that the wall is sufficiently illuminated, capturing the first image of the wall of the customer premises.

When the media adaptation device is directly plugged into the electrical wall outlet disposed on the wall, the media adaptation device might display, on a front display device or display screen that is disposed on a front face of the media adaptation device, a second image based on the captured first image of the wall of the customer premises. In some cases, the second image being displayed on the front display device might be an exact or precise copy of the first image being captured by the rear-facing camera. Alternatively, the second image might be image-processed by the media adaptation device and/or computing system (via network(s) and gateway) to generate an image of the wall that more naturally blends with the color and texture of the wall, while taking into account lighting or shadows (via light sensor data from light sensors among one or more sensors), and/or taking into account color, hue, saturation, and/or contrast characteristics of the rear-facing camera or of the first image captured by the rear-facing camera, or the like. In such cases, the first image might contain image artifacts or the like that when directly displayed on the front display device might not blend smoothly with the color and texture of the wall, and thus image-processing may be necessary to generate the second image to address such image issues. In some cases, the rear-facing camera might continually capture first images while corresponding second images are displayed on the front display device to account for ambient light changes, to account for shadows caused by people or objects crossing in front of the wall and the media adaptation device, or to account for other image effects on the wall, and/or the like.

In some embodiments, concurrent with displaying the second image on the front display device, the media adaptation device might display, on each of the right side display device, the left side display device, and the top display device, the second image based on the captured first image of the wall of the customer premises. In some cases, concurrent with displaying the second image on the front display device, the media adaptation device might further display, on the bottom display device, the second image based on the captured first image of the wall of the customer premises.

According to some embodiments, the media adaptation device(s) might display the second image of the wall as a default setting, while displaying advertisements or messages on the front display device or display screen (and perhaps also on the top and/or side display devices or display screens disposed on corresponding top and/or side faces of the media adaptation device(s)) when the media adaptation device(s) detects via one or more sensors (including, but not limited to, a proximity sensor, a motion sensor, and/or the like), or the like. In such cases, the media adaptation device(s) might receive at least one advertisement from the advertising source(s) and corresponding database(s), via network(s), via gateway, and via electrical wall outlet(s). The media adaptation device might display the received at least one advertisement on the front display device (and perhaps also on the top and/or side display devices or display screens disposed on corresponding top and/or side faces of the media adaptation device(s)). The media adaptation device might capture, with a front-facing camera, a third image of an area in front of the media adaptation device. The media adaptation device (and/or the computing system) might analyze the third image to determine whether at least one individual is looking at the at least one advertisement being displayed on the front display device. Based on a determination that at least one individual is looking at the at least one advertisement being displayed on the front display device, the media adaptation device (and/or the computing system) might determine how long the at least one individual has been looking at the at least one advertisement being displayed on the front display device. The media adaptation device might send, over the network(s), information regarding which advertisements displayed on the front display device have been viewed by which individuals and for how long, based on the analysis of the third image and after determination of how long the at least one individual has been looking at the at least one advertisement being displayed on the front display device.

The various embodiments address issues with conventional customer premises devices, such as G.hn devices, that plug into electrical wall outlets disposed on a wall of a customer premises that are not able to blend aesthetically with the wall of the customer premises, where such devices typically also do not provide user interface functionality nor do they offer the possibility of enabling display of advertising to users present at the customer premises. Rather, the various embodiments comprise a media adaptation device(s) that each comprises one or more display devices on one or more faces thereof, where such display devices display images of the wall or display advertisements or other content after the media adaptation device(s) has been plugged into one or more electrical wall outlets disposed on a wall(s) of a customer premises. These and other aspects of the media adaptation device functionality are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, customer premises technology, G.hn gateway technology, user interface technology, and/or the like. In other aspects, certain embodiments, can improve the functioning of user equipment or systems themselves (e.g., customer premises devices, G.hn gateway devices, user interface technologies, etc.), for example, by capturing, with a rear-facing camera of a media adaptation device, a first image of a wall of a customer premises, the wall comprising an electrical wall outlet into which the media adaptation device is intended to be plugged; displaying, with the media adaptation device and on a front display device disposed on a front face of the media adaptation device, a second image based on the captured first image of the wall of the customer premises; and performing, with the media adaptation device, one or more first functions other than display of images or videos, after the media adaptation device has been plugged into the electrical wall outlet; and/or the like. In particular, to the extent any abstract concepts are present in the various embodiments, those concepts can be implemented as described herein by devices, software, systems, and methods that involve specific novel functionality (e.g., steps or operations), such as, capturing, with a rear-facing camera of a media adaptation device, a first image of a wall of a customer premises, the wall comprising an electrical wall outlet into which the media adaptation device is intended to be plugged; displaying, with the media adaptation device and on a front display device disposed on a front face of the media adaptation device, a second image based on the captured first image of the wall of the customer premises; and performing, with the media adaptation device, one or more first functions other than display of images or videos, after the media adaptation device has been plugged into the electrical wall outlet; and/or the like, to name a few examples, that extend beyond mere conventional computer processing operations. These functionalities can produce tangible results outside of the implementing computer system, including, merely by way of example, a media adaptation device(s) that comprises one or more display devices on one or more faces thereof, where such display devices display images of the wall or display advertisements or other content after the media adaptation device(s) has been plugged into one or more electrical wall outlets disposed on a wall(s) of a customer premises, and/or the like, at least some of which may be observed or measured by customers and/or service providers.

In an aspect, a method might comprise capturing, with a rear-facing camera of a media adaptation device, a first image of a wall of a customer premises, the wall comprising an electrical wall outlet into which the media adaptation device is intended to be plugged; displaying, with the media adaptation device and on a front display device disposed on a front face of the media adaptation device, a second image based on the captured first image of the wall of the customer premises; and performing, with the media adaptation device, one or more first functions other than display of images or videos, after the media adaptation device has been plugged into the electrical wall outlet.

In some embodiments, the media adaptation device might further comprise a right side display device disposed on a right face of the media adaptation device, a left side display device disposed on a left face of the media adaptation device, and a top display device disposed on a top face of the media adaptation device, wherein the method might further comprise, concurrent with displaying the second image on the front display device, displaying, with the media adaptation device and on each of the right side display device, the left side display device, and the top display device, the second image based on the captured first image of the wall of the customer premises. In some cases, the media adaptation device might further comprise a bottom display device disposed on a bottom face of the media adaptation device, wherein the method might further comprise, concurrent with displaying the second image on the front display device, displaying, with the media adaptation device and on the bottom display device, the second image based on the captured first image of the wall of the customer premises.

According to some embodiments, capturing the first image of the wall of the customer premises might comprise: determining, with the media adaptation device, whether the wall is sufficiently illuminated based on analysis of one or more temporarily captured images of the wall; based on a determination that the wall is not sufficiently illuminated, shining a light on the wall while capturing the first image of the wall of the customer premises, wherein shining the light on the wall comprises one of shining a light using a light source disposed on the media adaptation device or displaying a message on the front display device requesting that a user shine a light on the wall; and based on a determination that the wall is sufficiently illuminated, capturing the first image of the wall of the customer premises.

In some embodiments, the method might further comprise: receiving, with the media adaptation device and from at least one advertisement source over a network, at least one advertisement; displaying, on the front display device, the received at least one advertisement; capturing, with a front-facing camera of the media adaptation device, a third image of an area in front of the media adaptation device; analyzing, with the media adaptation device, the third image to determine whether at least one individual is looking at the at least one advertisement being displayed on the front display device; based on a determination that at least one individual is looking at the at least one advertisement being displayed on the front display device, determining, with the media adaptation device, how long the at least one individual has been looking at the at least one advertisement being displayed on the front display device; and sending, with the media adaptation device and over the network, information regarding which advertisements displayed on the front display device have been viewed by which individuals and for how long, based on the analysis of the third image and after determination of how long the at least one individual has been looking at the at least one advertisement being displayed on the front display device. In some instances, the front-facing camera might be isolated from other devices connected to the network regardless of whether or not the media adaptation device is connected to the network. In some cases, images captured by the front-facing camera might be deleted after analysis of the third image and after determination of how long the at least one individual has been looking at the at least one advertisement being displayed on the front display device.

According to some embodiments, performing the one or more first functions other than display of images or videos might comprise at least one of: performing wireless access point functionality; performing wireless communications functionality; performing Ethernet communications functionality; performing Ethernet over powerline functionality; performing Ethernet over twisted pair functionality; or performing WiFi mesh functionality; and/or the like.

In some embodiments, the media adaptation device might be among a plurality of media adaptation devices that are disposed and plugged into electrical wall outlets located within the customer premises, wherein the media adaptation device and at least one other media adaptation device among the plurality of media adaptation devices might comprise two or more wireless access points, wherein the method might further comprise: receiving, with the media adaptation device and from a client device that is associated with a user and that is communicatively coupled wirelessly to the media adaptation device, a query as to which access point among the two or more wireless access points the client device is communicatively coupled wirelessly to; and sending, with the media adaptation device, a notification to the client device, the notification comprising information regarding the media adaptation device, the information comprising at least one of device identification information associated with the media adaptation device, a symbol associated with the media adaptation device, a user-given nickname associated with the media adaptation device, or a user-selectable color associated with the media adaptation device, and/or the like.

According to some embodiments, the media adaptation device might comprise a wireless access point, wherein the method might further comprise: in response to initialization of the media adaptation device or in response to user input indicating resetting of the wireless access point, displaying, with the media adaptation device and on the front display device, one or more wireless configuration steps; and in response to a user completing the one or more wireless configuration steps displayed on the front display device, configuring the wireless access point of the media adaptation device.

In another aspect, a media adaptation device might comprise a rear-facing camera; a front display device disposed on a front face of the media adaptation device; at least one processor; and a non-transitory computer readable medium communicatively coupled to the at least one processor. The non-transitory computer readable medium might have stored thereon computer software comprising a set of instructions that, when executed by the at least one processor, causes the media adaptation device to: capture, with the rear-facing camera, a first image of a wall of a customer premises, the wall comprising an electrical wall outlet into which the media adaptation device is intended to be plugged; display, on the front display device, a second image based on the captured first image of the wall of the customer premises; and perform one or more first functions other than display of images or videos, after the media adaptation device has been plugged into the electrical wall outlet.

In some embodiments, the media adaptation device might further comprise a right side display device disposed on a right face of the media adaptation device, a left side display device disposed on a left face of the media adaptation device, and a top display device disposed on a top face of the media adaptation device, wherein the set of instructions, when executed by the at least one processor, might further cause the media adaptation device to: concurrent with displaying the second image on the front display device, display, on each of the right side display device, the left side display device, and the top display device, the second image based on the captured first image of the wall of the customer premises. In some cases, the media adaptation device might further comprise a bottom display device disposed on a bottom face of the media adaptation device, wherein the set of instructions, when executed by the at least one processor, might further cause the media adaptation device to: concurrent with displaying the second image on the front display device, display, on the bottom display device, the second image based on the captured first image of the wall of the customer premises.

According to some embodiments, capturing the first image of the wall of the customer premises might comprise: determining whether the wall is sufficiently illuminated based on analysis of one or more temporarily captured images of the wall; based on a determination that the wall is not sufficiently illuminated, shining a light on the wall while capturing the first image of the wall of the customer premises, wherein shining the light on the wall comprises one of shining a light using a light source disposed on the media adaptation device or displaying a message on the front display device requesting that a user shine a light on the wall; and based on a determination that the wall is sufficiently illuminated, capturing the first image of the wall of the customer premises.

In some embodiments, the media adaptation device might further comprise a front-facing camera, wherein the set of instructions, when executed by the at least one processor, might further cause the media adaptation device to: receive, from at least one advertisement source over a network, at least one advertisement; display, on the front display device, the received at least one advertisement; capture, with the front-facing camera, a third image of an area in front of the media adaptation device; analyze the third image to determine whether at least one individual is looking at the at least one advertisement being displayed on the front display device; based on a determination that at least one individual is looking at the at least one advertisement being displayed on the front display device, determine how long the at least one individual has been looking at the at least one advertisement being displayed on the front display device; and send, over the network, information regarding which advertisements displayed on the front display device have been viewed by which individuals and for how long, based on the analysis of the third image and after determination of how long the at least one individual has been looking at the at least one advertisement being displayed on the front display device.

According to some embodiments, performing the one or more first functions other than display of images or videos might comprise at least one of: performing wireless access point functionality; performing wireless communications functionality; performing Ethernet communications functionality; performing Ethernet over powerline functionality; performing Ethernet over twisted pair functionality; or performing WiFi mesh functionality; and/or the like.

In some embodiments, the media adaptation device might be among a plurality of media adaptation devices that are disposed and plugged into electrical wall outlets located within the customer premises, wherein the media adaptation device and at least one other media adaptation device among the plurality of media adaptation devices might comprise two or more wireless access points, wherein the set of instructions, when executed by the at least one processor, might further cause the media adaptation device to: receive, from a client device that is associated with a user and that is communicatively coupled wirelessly to the media adaptation device, a query as to which access point among the two or more wireless access points the client device is communicatively coupled wirelessly to; and send a notification to the client device, the notification comprising information regarding the media adaptation device, the information comprising at least one of device identification information associated with the media adaptation device, a symbol associated with the media adaptation device, a user-given nickname associated with the media adaptation device, or a user-selectable color associated with the media adaptation device, and/or the like.

According to some embodiments, the media adaptation device might comprise a wireless access point, wherein the set of instructions, when executed by the at least one processor, might further cause the media adaptation device to: in response to initialization of the media adaptation device or in response to user input indicating resetting of the wireless access point, display, on the front display device, one or more wireless configuration steps; and in response to a user completing the one or more wireless configuration steps displayed on the front display device, configure the wireless access point of the media adaptation device.

In some embodiments, the front facing camera might be disposed on at least one of the front face of the media adaptation device, a top face of the media adaptation device, or a side face of the media adaptation device, and/or the like. The rear facing camera might be disposed on at least one of the rear face of the media adaptation device, the top face of the media adaptation device, a bottom face of the media adaptation device, or the side face of the media adaptation device, and/or the like.

According to some embodiments, the media adaptation device might further comprise a user interface device. The user interface device might comprise at least one of one or more physical buttons or one or more touchscreen buttons, and/or the like. The one or more physical buttons might be disposed on at least one of a top face of the media adaptation device, a left side face of the media adaptation device, or a right side face of the media adaptation device, and/or the like. The one or more touchscreen buttons might be disposed on at least one of the front face, the top face, the left side face, or the right side face, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing customer premises device functionality, and, more particularly, to methods, systems, and apparatuses for implementing media adaptation device functionality, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing media adaptation device functionality, in accordance with various embodiments.

In the non-limiting embodiment of FIG. 1, system 100 might comprise one or more media adaptation devices 105, one or more electrical wall outlets 110a disposed on one or more walls 110, one or more user devices 115, and a gateway 120 (e.g., a G.hn gateway, or the like), each disposed in a customer premises 125. According to some embodiments, the one or more media adaptation devices 105 (examples of which are shown in, and described below with respect to, FIGS. 2A-3D) might each include, without limitation, at least one of a processor 105a, a data store 105b, one or more cameras 105c, one or more display screens (and/or display devices) 105d, one or more sensors 105e (optional), one or more user interface devices 105f (optional), a power supply 105g, or a (wireless) communications system(s) 105h, and/or the like. In some cases, the one or more display screens 105d might each include, but is not limited to, at least one of a liquid crystal display ("LCD") screen, a light emitting diode ("LED") display screen, an organic LED ("OLED") display screen, a quantum dot LED ("QLED") display screen, or a touchscreen display screen, and/or the like. In some instances, the one or more sensors 105e might each include, without limitation, at least one of a light sensor, a proximity sensor, a motion sensor, or an audio sensor, and/or the like. In some embodiments, the one or more user interface devices 105f might include, but is not limited to, at least one of one or more physical buttons, one or more soft or virtual (touchscreen) buttons, one or more touchscreen interfaces, or one or more voice interfaces, and/or the like.

In some cases, the power supply 105g might include, without limitation, at least one of a power adapter that converts (or transforms) electricity (i.e., by regulating voltage, stepping-up or stepping down voltage, limiting current, etc.) that is transmitted through an electrical wall outlet 110a, a battery(ies), a solar cell(s), and/or the like. In some instances, the wireless communications system 105h might include, but is not limited to, at least one of a wireless access point ("WAP"), a wireless communications system, an Ethernet communications system, an Ethernet over powerline transceiver system, an Ethernet over twisted pair transceiver system, or a WiFi mesh system, and/or the like. According to some embodiments, the one or more user devices 115 might include, without limitation, at least one of a laptop computer, a tablet computer, a smart phone, a mobile phone, a personal digital assistant, a remote control device, a portable gaming device, a television set, a smart television, a computer monitor, a laptop monitor, a set-top box ("STB"), a gaming console, a digital video recorder ("DVR"), a media playback and/or recording device, a kitchen appliance, or a home appliance, and/or the like. The one or more user devices 115 might communicatively couple to one or more of the media adaptation devices 105 via communications system(s) 105h of each corresponding media adaptation device 105.

In some embodiments, system 100 might further comprise a computing system 130 (optional) and corresponding database(s) 135 (optional) that may communicatively couple to the gateway 120 (e.g., a G.hn gateway, or the like) via network(s) 140 or communicatively couple to a media adaptation devices 105 via the electrical wall outlet 110a to which the media adaptation device 105 is plugged, via the gateway 120, and via network(s) 140. System 100 might further comprise one or more advertising sources 145 (optional) and corresponding database(s) 150 (optional) that may communicatively couple to the gateway 120 via network(s) 140 or communicatively couple to a media adaptation devices 105 via the electrical wall outlet 110a to which the media adaptation device 105 is plugged, via the gateway 120 and via network(s) 140.

In operation, a media adaptation device 105 might capture, using a rear-facing camera(s) among the one or more cameras 105c, a first image of a wall 110 of the customer premises 125. In some cases, the rear-facing camera(s) might be disposed on at least one of a rear face of the media adaptation device 105, a top face of the media adaptation device 105, a bottom face of the media adaptation device 105, and/or a side face of the media adaptation device 105. In some cases, the media adaptation device 105 might be directly plugged into an electrical wall outlet 110a disposed on the wall 110, while the first image is being captured. Alternatively, the media adaptation device 105 might be plugged into the electrical wall outlet 110a disposed on the wall 110 via an extension cord (not shown) connecting the media adaptation device 105 to the electrical wall outlet 110a, while the first image is being captured. In some instances, capturing the first image of the wall 110 of the customer premises 125 might comprise determining, with the media adaptation device 105, whether the wall 110 is sufficiently illuminated based on analysis of one or more temporarily captured images of the wall 110; based on a determination that the wall 110 is not sufficiently illuminated, shining a light on the wall 110 while capturing the first image of the wall 110 of the customer premises 125, wherein shining the light on the wall 110 comprises one of shining a light using a light source (not shown in FIG. 1) disposed on the media adaptation device 105 or displaying a message on a front display device 105d among the one or more display screens 105d of the media adaptation device 105 requesting that a user shine a light on the wall 110; and based on a determination that the wall 110 is sufficiently illuminated, capturing the first image of the wall 110 of the customer premises 125.

When the media adaptation device 105 is directly plugged into the electrical wall outlet 110a disposed on the wall 110, the media adaptation device 105 might display, on a front display device or display screen 105d among the one or more display screens 105d that is disposed on a front face of the media adaptation device 105, a second image based on the captured first image of the wall 110 of the customer premises 125. In some cases, the second image being displayed on the front display device might be an exact or precise copy of the first image being captured by the rear-facing camera. Alternatively, the second image might be image-processed by the processor 105a and/or computing system 130 (via network(s) 140 and gateway 120) to generate an image of the wall 110 that more naturally blends with the color and texture of the wall, while taking into account lighting or shadows (via light sensor data from light sensors among the one or more sensors 105e), and/or taking into account color, hue, saturation, and/or contrast characteristics of the rear-facing camera or of the first image captured by the rear-facing camera, or the like. In such cases, the first image might contain image artifacts or the like that when directly displayed on the front display device might not blend smoothly with the color and texture of the wall, and thus image-processing may be necessary to generate the second image to address such image issues. In some cases, the rear-facing camera might continually capture first images while corresponding second images are displayed on the front display device to account for ambient light changes, to account for shadows caused by people or objects crossing in front of the wall 110 and the media adaptation device 105, or to account for other image effects on the wall 110, and/or the like.

In some embodiments, concurrent with displaying the second image on the front display device, the media adaptation device 105 might display, on each of the right side display device, the left side display device, and the top display device, the second image based on the captured first image of the wall 110 of the customer premises 125. In some cases, concurrent with displaying the second image on the front display device, the media adaptation device 105 might further display, on the bottom display device, the second image based on the captured first image of the wall 110 of the customer premises 125.

According to some embodiments, the media adaptation device(s) 105 might display the second image of the wall 110 as a default setting, while displaying advertisements or messages on the front display device or display screen (and perhaps also on the top and/or side display devices or display screens disposed on corresponding top and/or side faces of the media adaptation device(s) 105) when the media adaptation device(s) 105 detects via one or more sensors 105e (including, but not limited to, a proximity sensor, a motion sensor, and/or the like), or the like. In such cases, the media adaptation device(s) 105 might receive at least one advertisement from the advertising source(s) 145 and corresponding database(s) 150, via network(s) 140, via gateway 120, and via electrical wall outlet(s) 110a. The media adaptation device 105 might display the received at least one advertisement on the front display device (and perhaps also on the top and/or side display devices or display screens disposed on corresponding top and/or side faces of the media adaptation device(s) 105). The media adaptation device 105 might capture, with a front-facing camera, a third image of an area in front of the media adaptation device. The media adaptation device 105 (and/or the computing system 130) might analyze the third image to determine whether at least one individual is looking at the at least one advertisement being displayed on the front display device. Based on a determination that at least one individual is looking at the at least one advertisement being displayed on the front display device, the media adaptation device 105 (and/or the computing system 130) might determine how long the at least one individual has been looking at the at least one advertisement being displayed on the front display device. The media adaptation device 105 might send, over the network(s) 140, information regarding which advertisements displayed on the front display device have been viewed by which individuals and for how long, based on the analysis of the third image and after determination of how long the at least one individual has been looking at the at least one advertisement being displayed on the front display device.

In some aspects, the front-facing camera might be isolated from other devices connected to the network(s) 140 regardless of whether or not the media adaptation device 105 is connected to the network(s) 140 (via the electrical wall outlet 110a and via the gateway 120). In some instances, images captured by the front-facing camera may be deleted after analysis of the third image and after determination of how long the at least one individual has been looking at the at least one advertisement being displayed on the front display device.

The media adaptation device 105—while displaying either the image of the wall 110 and/or advertisements or messages on the front display screen (and perhaps also on the top and/or side display devices or display screens disposed on corresponding top and/or side faces of the media adaptation device(s) 105)—might perform one or more first functions other than display of images or videos, after the media adaptation device 105 has been plugged into the electrical wall outlet 110a. In some embodiments, performing the one or more first functions other than display of images or videos might include, without limitation, at least one of: performing wireless access point ("WAP") functionality; performing wireless communications functionality; performing Ethernet communications functionality; performing Ethernet over powerline functionality; performing Ethernet over twisted pair functionality; or performing WiFi mesh functionality; and/or the like; in some cases, using the communications system(s) 105h of the media adaptation device 105 that provide such first functions to at least one of the one or more user devices 115.

In some embodiments, the media adaptation device 105 may be among a plurality of media adaptation devices 105 that are disposed and plugged into electrical wall outlets 110a disposed on wall(s) 110 located within the customer premises 125, wherein the media adaptation device and at least one other media adaptation device among the plurality of media adaptation devices 105 might comprise two or more wireless access points. In such cases, the media adaptation device 105 might receive, from a user device 115 that is associated with a user and that is communicatively coupled wirelessly to the media adaptation device 105 (via communications system(s) 105h), a query as to which access point among the two or more wireless access points the user device 115 is communicatively coupled wirelessly to; and might send a notification to the user device 115, the notification comprising information regarding the media adaptation device 105, the information including, without limitation, at least one of device identification information associated with the media adaptation device, a symbol associated with the media adaptation device, a user-given nickname associated with the media adaptation device, or a user-selectable color associated with the media adaptation device, and/or the like.

According to some embodiments, the media adaptation device might comprise a wireless access point. In response to initialization of the media adaptation device 105 or in response to user input indicating resetting of the wireless access point, the media adaptation device 105 might display, on the front display device, one or more wireless configuration steps, and might, in response to a user completing the one or more wireless configuration steps displayed on the front display device, configure the wireless access point of the media adaptation device 105.

These and other functions of the system 100 (and its components) are described in greater detail below with respect to FIGS. 2-4.

Figure 2H:
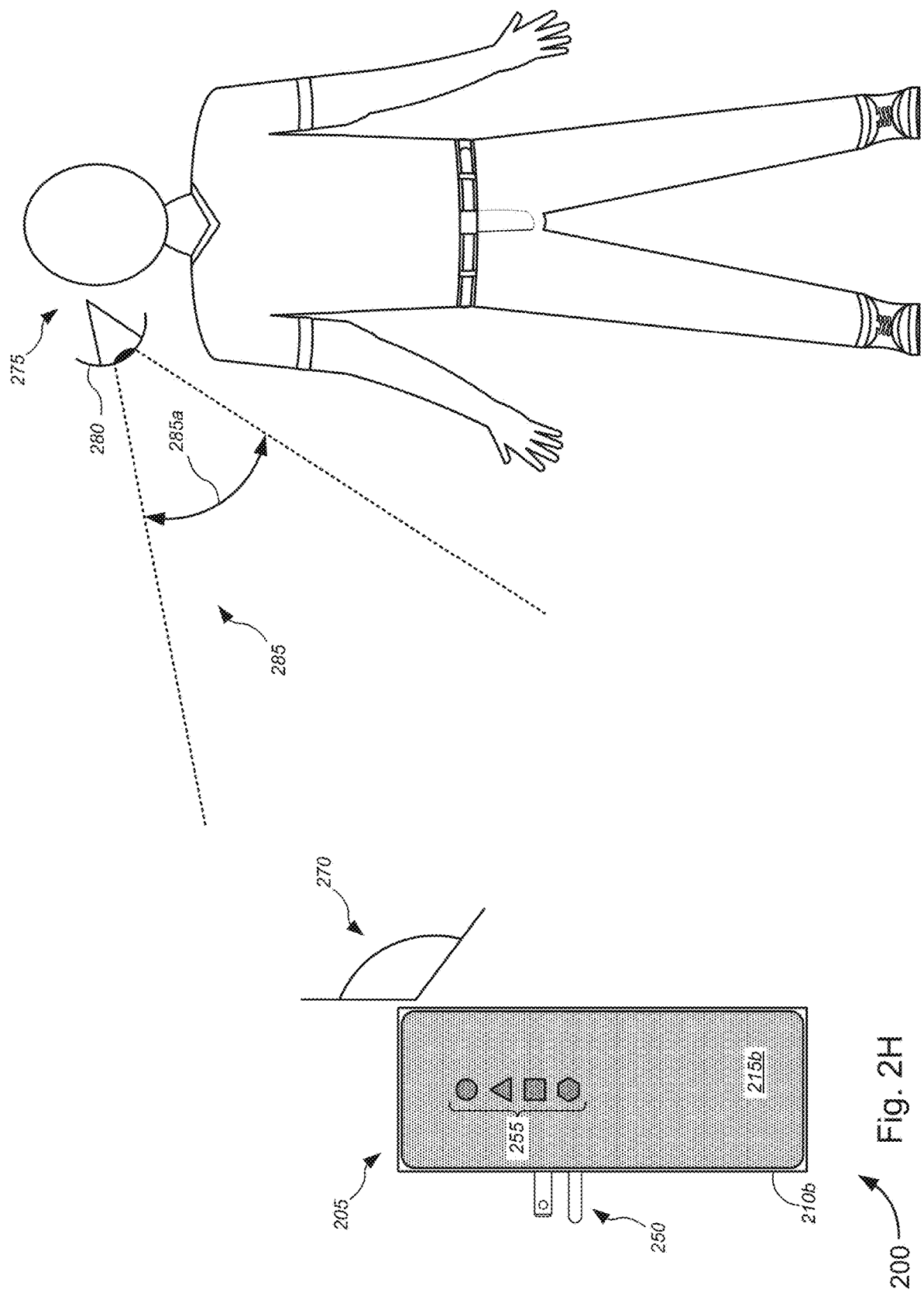
FIGS. 2A-2P are schematic diagrams illustrating non-limiting examples of various views of a media adaptation device that is configured to plug into an electrical wall outlet disposed on a wall of a customer premises, in accordance with various embodiments.

FIGS. 2A-2P (collectively, "FIG. 2") are schematic diagrams illustrating non-limiting examples 200 and 200' of various views of a media adaptation device that is configured to plug into an electrical wall outlet disposed on a wall of a customer premises, in accordance with various embodiments. FIGS. 2A-2F depict a first example 200 of a media adaptation device 205 that may be plugged into an electrical wall outlet 260 as shown in FIG. 2G, and FIG. 2H depicts a front-facing camera(s) on a front face of the media adaptation device 205 capturing an image(s) of a user 275 viewing a front display screen of the media adaptation device 205, while FIGS. 2I-2N depict a second example 200' of a media adaptation device 205' that may be plugged into an electrical wall outlet 260 as shown in FIG. 2O, and FIG. 2P depicts a front-facing camera(s) on a top face of the media adaptation device 205' capturing an image(s) of a user 275 viewing a front display screen of the media adaptation device 205'. Although Type B plug and socket is shown in FIGS. 2A-2P, the various embodiments is not so limited, and any suitable plug and socket may be used, including, but not limited to, one of Type A, Type B, Type C, Type D, Type E, Type F, Type G, Type H, Type I, Type J, Type K, Type L, Type M, Type N, or Type O, or the like, which may be dependent on which country or region the media adaptation device is intended to be used.

With reference to FIGS. 2A-2G, a first example 200 of a media adaptation device 205 is shown. The media adaptation device 205 might include, without limitation, a left side face 210b (as shown in FIG. 2A), a front face 210a (as shown in FIG. 2B), a rear face 210d (as shown in FIG. 2C), a right side face 210c (as shown in FIG. 2D), a top face 210e (as shown in FIG. 2E), and a bottom face 210f (as shown in FIG. 2F). On the front face 210a might be disposed a front display device or display screen 215a (as shown in FIG. 2B), and on the left side face 210b might be disposed a left side display device or display screen 215b (as shown in FIG. 2A), while on the right side face 210c might be disposed a right side display device or display screen 215c (as shown in FIG. 2D), and on the top face 210e might be disposed a top display device or display screen 215e (as shown in FIG. 2E). Although not shown in FIG. 2C, in some cases, a rear display device or display screen 215d might be disposed on the rear face 210d. Similarly, although not shown in FIG. 2F, in some instances, a bottom display device or display screen 215f might be disposed on the bottom face 210f.

In some embodiments, a front-facing camera(s) 220 might be disposed on the front face 210a of the media adaptation device 205, as shown in FIG. 2B. In some cases, as shown in FIG. 2B, a front light source(s) 225 might be disposed on the front face 210a of the media adaptation device 205, in some instances, proximate to the front-facing camera(s) 220. In some instances, as shown in FIG. 2B, one or more sensors 230 (including, but not limited to, at least one of a light sensor, a proximity sensor, a motion sensor, or an audio sensor, and/or the like) might be disposed on the front face 210a of the media adaptation device 205, in some cases, proximate to the front-facing camera(s) 220 and/or the front light source(s) 225.

According to some embodiments, a rear-facing camera(s) 235 might be disposed on the rear face 210d of the media adaptation device 205, as shown in FIG. 2C. In some cases, as shown in FIG. 2C, a rear light source(s) 240 might be disposed on the rear face 210d of the media adaptation device 205, in some instances, proximate to the rear-facing camera(s) 235. In some instances, as shown in FIG. 2C, one or more sensors 245 (including, but not limited to, at least one of a light sensor, a proximity sensor, a motion sensor, or an audio sensor, and/or the like) might be disposed on the rear face 210d of the media adaptation device 205, in some cases, proximate to the rear-facing camera(s) 235 and/or the rear light source(s) 240.

In some embodiments, the media adaptation device 205 might further include, but is not limited to, an electrical plug 250 that is configured to plug into an electrical outlet (e.g., electrical outlet 260 that may be disposed on a wall 265 of a customer premises, as shown in FIG. 2G, or the like) and/or one or more physical buttons 255 that is disposed on a side face (e.g., left side face 210b, as shown in FIG. 2A, and also shown extending from the side of the media adaptation device 205 as shown in FIGS. 2B, 2C, 2E, and 2F). As shown in FIGS. 2A and 2B, the media adaptation device 205 might have a height H, a width W, and a depth D, in some cases, having a height H that is between about 4.8 and about 6.0 inches (between about 12.2 and about 15.2 cm, or the like), a width W that is between about 3.0 and about 4.0 inches (between about 7.6 and about 10.2 cm, or the like), and a depth D that is between about 0.5 and about 2.5 inches (between about 1.3 and about 6.4 cm, or the like).

In operation, media adaptation device 205 might capture, using rear-facing camera(s) 235, a first image of a wall 265 of the customer premises. Although the rear-facing camera(s) 235 might be disposed on the rear face 210d of the media adaptation device 205, the various embodiments are not so limited, and the rear-facing camera(s) 235 may alternatively, or additionally, be disposed on at least one of a top face 210e of the media adaptation device 205, a bottom face 210f of the media adaptation device 205, and/or a side face 210b or 210c of the media adaptation device 205. In some cases, the media adaptation device 205 might be directly plugged into an electrical wall outlet 260 disposed on the wall 265, while the first image is being captured. Alternatively, the media adaptation device 205 might be plugged into the electrical wall outlet 260 disposed on the wall 265 via an extension cord (not shown) connecting the media adaptation device 205 to the electrical wall outlet 260, while the first image is being captured. In some instances, capturing the first image of the wall 265 of the customer premises might comprise determining, with the media adaptation device 205, whether the wall 265 is sufficiently illuminated based on analysis of one or more temporarily captured images of the wall 265; based on a determination that the wall 265 is not sufficiently illuminated, shining a light on the wall 265 while capturing the first image of the wall 265 of the customer premises, wherein shining the light on the wall 265 comprises one of shining a light using a light source disposed on the media adaptation device 205 (i.e., rear light source(s) 240, as shown in FIG. 2C) or displaying a message on a front display device 215a of the media adaptation device 205 requesting that a user shine a light (e.g., a flashlight, or the like) on the wall 265; and based on a determination that the wall 265 is sufficiently illuminated, capturing the first image of the wall 265 of the customer premises. As shown in FIG. 2B, an image of the wall 265 (of FIG. 2G) is depicted as being displayed on the front display device or display screen 215a, including color and texture of the wall 265. The image of the wall 265 (of FIG. 2G) is also depicted as being concurrently displayed on the left side display device or display screen 215b (as shown in FIG. 2A), on the right side display device or display screen 215c (as shown in FIG. 2D), and on the top display device or display screen 215e (as shown in FIG. 2E), including color and texture of the wall 265.

When the media adaptation device 205 is directly plugged into the electrical wall outlet 260 disposed on the wall 265, the media adaptation device 205 might display, on a front display device or display screen 215a among the one or more display screens 215a that is disposed on a front face of the media adaptation device 205, a second image based on the captured first image of the wall 265 of the customer premises. In some cases, the second image being displayed on the front display device might be an exact or precise copy of the first image being captured by the rear-facing camera. Alternatively, the second image might be image-processed by the media adaptation device 205 and/or a remote computing system (via a network(s) and a gateway) to generate an image of the wall 265 that more naturally blends with the color and texture of the wall, while taking into account lighting or shadows (via light sensor data from light sensors among the one or more sensors 230), and/or taking into account color, hue, saturation, and/or contrast characteristics of the rear-facing camera or of the first image captured by the rear-facing camera, or the like. In such cases, the first image might contain image artifacts or the like that when directly displayed on the front display device might not blend smoothly with the color and texture of the wall, and thus image-processing may be necessary to generate the second image to address such image issues. In some cases, the rear-facing camera(s) 235 might continually capture first images while corresponding second images are displayed on the front display device 215a to account for ambient light changes, to account for shadows caused by people or objects crossing in front of the wall 265 and the media adaptation device 205, or to account for other image effects on the wall 265, and/or the like. In some instances, machine learning or artificial intelligence ("AI") might be used to determine how ambient light changes, shadows, or other image effects may affect how the second images displayed on each of the left side display device or display screen 215b, the right side display device or display screen 215c, and the top display device or display screen 215e should be modified to correspond to the modified second image being displayed on the front display device 215a to display a collective or integrated image across the display devices or screens 215a, 215b, 215c, and 215e as if the media adaptation device 205 were part of the wall, and to account for ambient light changes, to account for shadows caused by people or objects crossing in front of the wall 265 and the media adaptation device 205, or to account for other image effects on the wall 265, and/or the like.

According to some embodiments, the media adaptation device 205 might display the second image of the wall 265 as a default setting, while displaying advertisements or messages on the front display device or display screen 215a (and perhaps also on the top and/or side display devices or display screens 215b, 215c, and/or 215e disposed on corresponding top and/or side faces 210b, 210c, and/or 210e of the media adaptation device 205) when the media adaptation device 205 detects via one or more sensors 230 (including, but not limited to, a proximity sensor, a motion sensor, and/or the like), or the like. In such cases, the media adaptation device 205 might receive at least one advertisement from an advertising source(s) (e.g., advertising source(s) 145 and corresponding database(s) 150 of FIG. 1, or the like, via network(s) 140, via gateway 120, and via electrical wall outlet(s) 110a of FIG. 1, or the like). The media adaptation device 205 might display the received at least one advertisement on the front display device 215a (and perhaps also on the top and/or side display devices or display screens 215b, 215c, and/or 215e disposed on corresponding top and/or side faces 210b, 210c, and/or 210e of the media adaptation device 205).

Referring to FIGS. 2B and 2H, the media adaptation device 205 might capture, with front-facing camera(s) 220, a third image of an area in front of the media adaptation device 205. As shown in FIG. 2H, the front-facing camera(s) 220 on the front face 210a of the media adaptation device 205 might have a field of view 270 that might capture an image of the front of the media adaptation device 205. As also shown in FIG. 2H, the user 275 might be looking at the front display device 215a of the media adaptation device 205, as depicted by user's eye(s) 280 (shown as a disembodied eye beside the head of the user 275), which might have a field of view 285 defining an angle 285a that is rotated about a 360 degree direction about an axis that is normal to the lens of the user's eye(s) 280. The media adaptation device 205 might analyze the third image to determine whether at least one individual is looking at the at least one advertisement being displayed on the front display device, by analyzing the third image to identify the user's eye(s) 280 and the field of view 285. In some cases, the media adaptation device 205 might also analyze the third image to identify the user 275. Based on a determination that at least one individual is looking at the at least one advertisement being displayed on the front display device 215a (in the case that user 275 is looking at the at least one advertisement being displayed on the front display device 215a), the media adaptation device 205 might determine how long the at least one individual (i.e., the user 275) has been looking at the at least one advertisement being displayed on the front display device 215a, by analyzing how long the user's eye(s) 280 and the field of view 285 have been directed toward the front display device 215a. The media adaptation device 205 might send, over a network(s), information regarding which advertisements displayed on the front display device 215a have been viewed by which individuals and for how long, based on the analysis of the third image and after determination of how long the at least one individual has been looking at the at least one advertisement being displayed on the front display device 215a.

In some cases, the one or more sensors 230 might also be used to detect motion or proximity of the user 275, which might trigger the front-facing camera(s) 220 to capture the third image. In some instances, the one or more sensors 230 might be used to determine whether the user 275 is sufficiently illuminated. If not, the front light source(s) 225 might be used to illuminate the user 275 or the area in front of the media adaptation device 205, prior to the front-facing camera(s) 220 capturing the third image.

In some aspects, the front-facing camera(s) 220 might be isolated from other devices connected to the network(s) regardless of whether or not the media adaptation device 205 is connected to the network(s) (via the electrical wall outlet 260 and via a G.hn gateway or the like). In some instances, images captured by the front-facing camera(s) 220 may be deleted after analysis of the third image and after determination of how long the at least one individual has been looking at the at least one advertisement being displayed on the front display device 215a.

The media adaptation device 205—while displaying either the image of the wall 265 and/or advertisements or messages on the front display screen 215a (and perhaps also on the top and/or side display devices or display screens 215b, 215c, and/or 215e disposed on corresponding top and/or side faces 210b, 210c, and/or 210e of the media adaptation device 205)—might perform one or more first functions other than display of images or videos, after the media adaptation device 205 has been plugged into the electrical wall outlet 260. In some embodiments, performing the one or more first functions other than display of images or videos might include, without limitation, at least one of: performing wireless access point ("WAP") functionality; performing wireless communications functionality; performing Ethernet communications functionality; performing Ethernet over powerline functionality; performing Ethernet over twisted pair functionality; or performing WiFi mesh functionality; and/or the like; in some cases, using the communications system(s) of the media adaptation device 205 that provide such first functions to at least one of the one or more user devices (e.g., user device(s) 115 of FIG. 1, or the like).

Referring to FIGS. 2I-2O, a second example 200' of a media adaptation device 205' is shown. The media adaptation device 205' might include, without limitation, a left side face 210b (as shown in FIG. 2I), a front face 210a (as shown in FIG. 2J), a rear face 210d (as shown in FIG. 2K), a right side face 210c (as shown in FIG. 2L), a top face 210e (as shown in FIG. 2M), and a bottom face 210f (as shown in FIG. 2N). On the front face 210a might be disposed a front display device or display screen 215a (as shown in FIG. 2J), and on the left side face 210b might be disposed a left side display device or display screen 215b (as shown in FIG. 2I), while on the right side face 210c might be disposed a right side display device or display screen 215c (as shown in FIG. 2L), and on the top face 210e might be disposed a top display device or display screen 215e (as shown in FIG. 2M). Although not shown in FIG. 2K, in some cases, a rear display device or display screen 215d might be disposed on the rear face 210d. Similarly, although not shown in FIG. 2N, in some instances, a bottom display device or display screen 215f might be disposed on the bottom face 210f.

In some embodiments, a front-facing camera(s) 220 might be disposed on the top face 210e of the media adaptation device 205', as shown in FIG. 2M. In some cases, as shown in FIG. 2M, a front light source(s) 225 might be disposed on the top face 210e of the media adaptation device 205', in some instances, proximate to the front-facing camera(s) 220.

In some instances, as shown in FIG. 2M, one or more sensors 230 (including, but not limited to, at least one of a light sensor, a proximity sensor, a motion sensor, or an audio sensor, and/or the like) might be disposed on the top face 210e of the media adaptation device 205', in some cases, proximate to the front-facing camera(s) 220 and/or the front light source(s) 225. In these embodiments, because the front-facing camera(s) 220, the front light source(s) 225, and/or the one or more sensors 230 are disposed on the top face 210e of the media adaptation device 205', each of the front-facing camera(s) 220, the front light source(s) 225, and/or the one or more sensors 230 might be tilted within their respective housings to face an area in front of the media adaptation device 205' and also to face upward (as depicted by the point of view 270' of the front-facing camera(s) 220, as shown in FIG. 2P).

According to some embodiments, a rear-facing camera(s) 235 might be disposed on the bottom face 210f of the media adaptation device 205', as shown in FIG. 2N. In some cases, as shown in FIG. 2N, a rear light source(s) 240 might be disposed on the bottom face 210f of the media adaptation device 205', in some instances, proximate to the rear-facing camera(s) 235. In some instances, as shown in FIG. 2N, one or more sensors 245 (including, but not limited to, at least one of a light sensor, a proximity sensor, a motion sensor, or an audio sensor, and/or the like) might be disposed on the bottom face 210f of the media adaptation device 205', in some cases, proximate to the rear-facing camera(s) 235 and/or the rear light source(s) 240. In these embodiments, because the rear-facing camera(s) 235, the rear light source(s) 240, and/or the one or more sensors 245 are disposed on the bottom face 210f of the media adaptation device 205', each of the rear-facing camera(s) 235, the rear light source(s) 240, and/or the one or more sensors 245 might be tilted within their respective housings to face an area toward the rear of the media adaptation device 205' (i.e., toward the wall 265 when the media adaptation device 205' is plugged into the electrical wall outlet 260).

In some embodiments, the media adaptation device 205' might further include, but is not limited to, an electrical plug 250 that is configured to plug into an electrical outlet (e.g., electrical outlet 260 that may be disposed on a wall 265 of a customer premises, as shown in FIG. 2O, or the like) and/or one or more soft or virtual (touchscreen) buttons 255' that is disposed on (and flush against) a side face (e.g., left side face 210b, as shown in FIG. 2I). As shown in FIGS. 2I and 2J, the media adaptation device 205' might have a height H, a width W, and a depth D, in some cases, having a height H that is between about 4.8 and about 6.0 inches (between about 12.2 and about 15.2 cm, or the like), a width W that is between about 3.0 and about 4.0 inches (between about 7.6 and about 10.2 cm, or the like), and a depth D that is between about 0.5 and about 2.5 inches (between about 1.3 and about 6.4 cm, or the like).

In operation, media adaptation device 205' might capture, using rear-facing camera(s) 235, a first image of a wall 265 of the customer premises. Although the rear-facing camera(s) 235 might be disposed on the bottom face 210f of the media adaptation device 205', the various embodiments are not so limited, and the rear-facing camera(s) 235 may alternatively, or additionally, be disposed on at least one of a front face 210a of the media adaptation device 205', a top face 210e of the media adaptation device 205', and/or a side face 210b or 210c of the media adaptation device 205'. In some cases, the media adaptation device 205' might be directly plugged into an electrical wall outlet 260 disposed on the wall 265, while the first image is being captured.

Alternatively, the media adaptation device 205' might be plugged into the electrical wall outlet 260 disposed on the wall 265 via an extension cord (not shown) connecting the media adaptation device 205' to the electrical wall outlet 260, while the first image is being captured. In some instances, capturing the first image of the wall 265 of the customer premises might comprise determining, with the media adaptation device 205', whether the wall 265 is sufficiently illuminated based on analysis of one or more temporarily captured images of the wall 265; based on a determination that the wall 265 is not sufficiently illuminated, shining a light on the wall 265 while capturing the first image of the wall 265 of the customer premises, wherein shining the light on the wall 265 comprises one of shining a light using a light source disposed on the media adaptation device 205' (i.e., rear light source(s) 240, as shown in FIG. 2N) or displaying a message on a front display device 215a of the media adaptation device 205' requesting that a user shine a light (e.g., a flashlight, or the like) on the wall 265; and based on a determination that the wall 265 is sufficiently illuminated, capturing the first image of the wall 265 of the customer premises. As shown in FIG. 2J, an image of the wall 265 (of FIG. 2O) is depicted as being displayed on the front display device or display screen 215a, including color and texture of the wall 265. The image of the wall 265 (of FIG. 2O) is also depicted as being concurrently displayed on the left side display device or display screen 215b (as shown in FIG. 2I), on the right side display device or display screen 215c (as shown in FIG. 2L), and on the top display device or display screen 215e (as shown in FIG. 2M), including color and texture of the wall 265.

When the media adaptation device 205' is directly plugged into the electrical wall outlet 260 disposed on the wall 265, the media adaptation device 205' might display, on a front display device or display screen 215a among the one or more display screens 215a that is disposed on a front face of the media adaptation device 205', a second image based on the captured first image of the wall 265 of the customer premises. In some cases, the second image being displayed on the front display device might be an exact or precise copy of the first image being captured by the rear-facing camera. Alternatively, the second image might be image-processed by the media adaptation device 205' and/or a remote computing system (via a network(s) and a gateway) to generate an image of the wall 265 that more naturally blends with the color and texture of the wall, while taking into account lighting or shadows (via light sensor data from light sensors among the one or more sensors 230), and/or taking into account color, hue, saturation, and/or contrast characteristics of the rear-facing camera or of the first image captured by the rear-facing camera, or the like. In such cases, the first image might contain image artifacts or the like that when directly displayed on the front display device might not blend smoothly with the color and texture of the wall, and thus image-processing may be necessary to generate the second image to address such image issues. In some cases, the rear-facing camera(s) 235 might continually capture first images while corresponding second images are displayed on the front display device 215a to account for ambient light changes, to account for shadows caused by people or objects crossing in front of the wall 265 and the media adaptation device 205', or to account for other image effects on the wall 265, and/or the like. In some instances, machine learning or artificial intelligence ("AI") might be used to determine how ambient light changes, shadows, or other image effects may affect how the second images displayed on each of the left side display device or display screen 215b, the right side display device or display screen 215c, and the top display device or display screen 215e should be modified to correspond to the modified second image being displayed on the front display device 215a to display a collective or integrated image across the display devices or screens 215a, 215b, 215c, and 215e as if the media adaptation device 205' were part of the wall, and to account for ambient light changes, to account for shadows caused by people or objects crossing in front of the wall 265 and the media adaptation device 205', or to account for other image effects on the wall 265, and/or the like.

According to some embodiments, the media adaptation device 205' might display the second image of the wall 265 as a default setting, while displaying advertisements or messages on the front display device or display screen 215a (and perhaps also on the top and/or side display devices or display screens 215b, 215c, and/or 215e disposed on corresponding top and/or side faces 210b, 210c, and/or 210e of the media adaptation device 205') when the media adaptation device 205' detects via one or more sensors 230 (including, but not limited to, a proximity sensor, a motion sensor, and/or the like), or the like. In such cases, the media adaptation device 205' might receive at least one advertisement from an advertising source(s) (e.g., advertising source(s) 145 and corresponding database(s) 150 of FIG. 1, or the like, via network(s) 140, via gateway 120, and via electrical wall outlet(s) 110a of FIG. 1, or the like). The media adaptation device 205' might display the received at least one advertisement on the front display device 215a (and perhaps also on the top and/or side display devices or display screens 215b, 215c, and/or 215e disposed on corresponding top and/or side faces 210b, 210c, and/or 210e of the media adaptation device 205').

Referring to FIGS. 2M and 2P, the media adaptation device 205' might capture, with front-facing camera(s) 220, a third image of an area in front of the media adaptation device 205'. As shown in FIG. 2P, the front-facing camera(s) 220 on the top face 210e of the media adaptation device 205' might have a field of view 270' that might capture an image of the front of the media adaptation device 205'. As also shown in FIG. 2P, the user 275 might be looking at the front display device 215a of the media adaptation device 205', as depicted by user's eye(s) 280 (shown as a disembodied eye beside the head of the user 275), which might have a field of view 285 defining an angle 285a that is rotated about a 360 degree direction about an axis that is normal to the lens of the user's eye(s) 280. The media adaptation device 205' might analyze the third image to determine whether at least one individual is looking at the at least one advertisement being displayed on the front display device, by analyzing the third image to identify the user's eye(s) 280 and the field of view 285. In some cases, the media adaptation device 205' might also analyze the third image to identify the user 275. Based on a determination that at least one individual is looking at the at least one advertisement being displayed on the front display device 215a (in the case that user 275 is looking at the at least one advertisement being displayed on the front display device 215a), the media adaptation device 205' might determine how long the at least one individual (i.e., the user 275) has been looking at the at least one advertisement being displayed on the front display device 215a, by analyzing how long the user's eye(s) 280 and the field of view 285 have been directed toward the front display device 215a. The media adaptation device 205' might send, over a network(s), information regarding which advertisements displayed on the front display device 215a have been viewed by which individuals and for how long, based on the analysis of the third image and after determination of how long the at least one individual has been looking at the at least one advertisement being displayed on the front display device 215a. In some cases, the one or more sensors 230 might also be used to detect motion or proximity of the user 275, which might trigger the front-facing camera(s) 220 to capture the third image. In some instances, the one or more sensors 230 might be used to determine whether the user 275 is sufficiently illuminated. If not, the front light source(s) 225 might be used to illuminate the user 275 or the area in front of the media adaptation device 205', prior to the front-facing camera(s) 220 capturing the third image.

In some aspects, the front-facing camera(s) 220 might be isolated from other devices connected to the network(s) regardless of whether or not the media adaptation device 205' is connected to the network(s) (via the electrical wall outlet 260 and via a G.hn gateway or the like). In some instances, images captured by the front-facing camera(s) 220 may be deleted after analysis of the third image and after determination of how long the at least one individual has been looking at the at least one advertisement being displayed on the front display device 215a.

The media adaptation device 205'—while displaying either the image of the wall 265 and/or advertisements or messages on the front display screen 215a (and perhaps also on the top and/or side display devices or display screens 215b, 215c, and/or 215e disposed on corresponding top and/or side faces 210b, 210c, and/or 210e of the media adaptation device 205')—might perform one or more first functions other than display of images or videos, after the media adaptation device 205' has been plugged into the electrical wall outlet 260. In some embodiments, performing the one or more first functions other than display of images or videos might include, without limitation, at least one of: performing wireless access point ("WAP") functionality; performing wireless communications functionality; performing Ethernet communications functionality; performing Ethernet over powerline functionality; performing Ethernet over twisted pair functionality; or performing WiFi mesh functionality; and/or the like; in some cases, using the communications system(s) of the media adaptation device 205' that provide such first functions to at least one of the one or more user devices (e.g., user device(s) 115 of FIG. 1, or the like).

Although FIGS. 2A-2H depict a first example or embodiment 200 in which display devices 215a, 215b, 215c, and 215e are respectively disposed on the front, sides, and top faces 210a, 210b, 210c, and 210e, with no display devices disposed on the rear and bottom faces 210d and 210f, said first example or embodiment 200 comprising a front-facing camera(s) 220, a front light 225, and sensors 230 disposed on the front face 210a, said first example or embodiment 200 comprising a rear-facing camera(s) 235, a rear light 240, and sensors 245 disposed on the rear face 210d, and said first example or embodiment 200 comprising hard buttons or physical buttons 255 on the left side face 210b, while FIGS. 2I-2P depict a second example or embodiment 200' in which display devices 215a, 215b, 215c, and 215e are respectively disposed on the front, sides, and top faces 210a, 210b, 210c, and 210e, with no display devices disposed on the rear and bottom faces 210d and 210f, said second example or embodiment 200' comprising a front-facing camera(s) 220, a front light 225, and sensors 230 disposed on the top face 210e, said second example or embodiment 200' comprising a rear-facing camera(s) 235, a rear light 240, and sensors 245 disposed on the bottom face 210f, and said second example or embodiment 200' comprising soft or virtual (touchscreen) buttons 255' on the left side face 210b, the various embodiments are not so limited. In particular, the display devices 215 may be disposed on any, some, or all of the faces 210 (or disposed partially on any, some, or all of the faces 210), the front-facing camera(s) 220, the front light 225, and/or the sensors 230 may be disposed on any of the front, side, or top faces 210a, 210b, 210c, or 210e, the rear-facing camera(s) 235, the rear light 240, and the sensors 245 may be disposed on any of the rear, side, or bottom faces 210d, 210b, 210c, or 210f, and the user interface devices may comprise at least one of hard buttons or physical buttons 255 or soft or virtual (touchscreen) buttons 255' on any, some, or all of the front, rear, side, top, or bottom faces 210a-210f, and/or the like.

These and other functions of the media adaptation device 205 or 205' (and its components) are described in greater detail below with respect to FIGS. 1, 3, and 4.

Figure 3A:
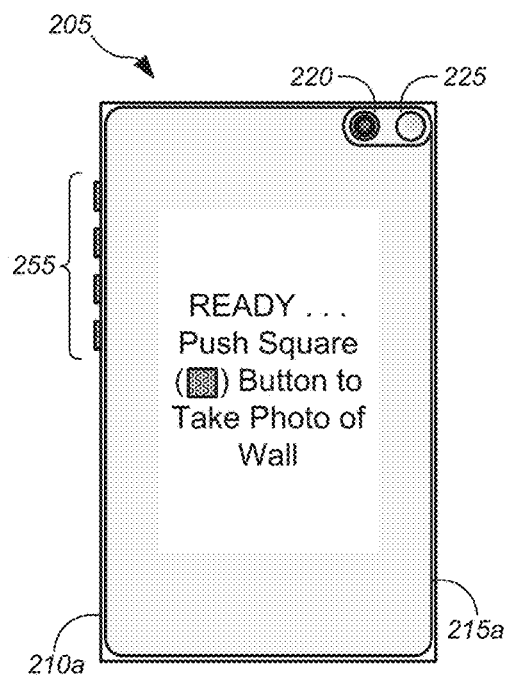
FIGS. 3A-3D are schematic diagrams illustrating various non-limiting examples of content being displayed on a front display screen of a media adaptation device, in accordance with various embodiments.
Figure 3B:
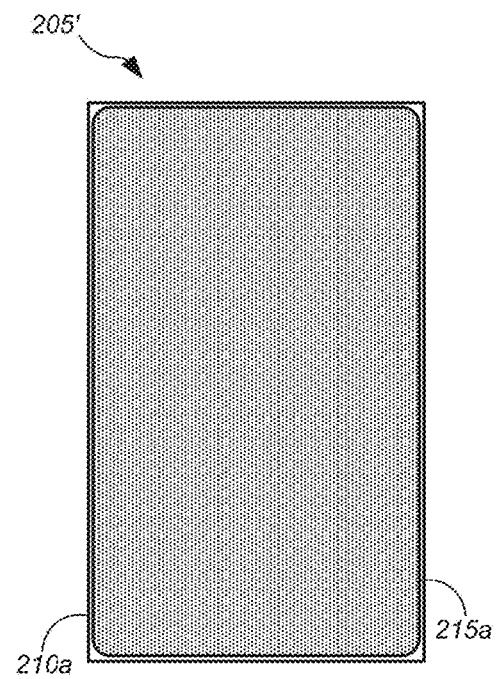
Figure 3C:
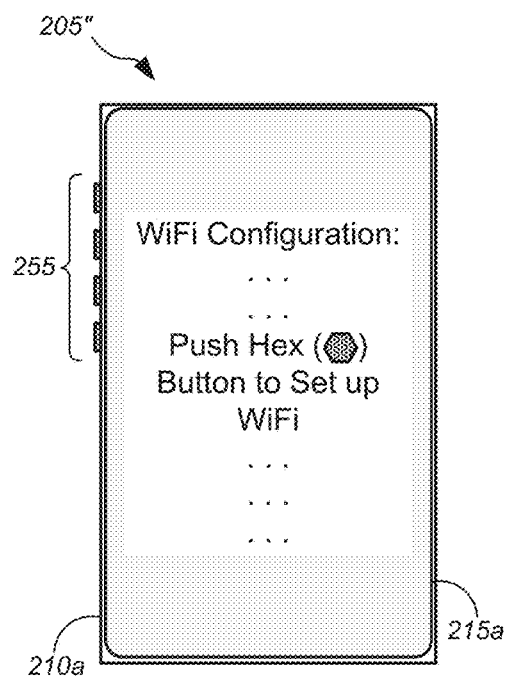
Figure 3D:
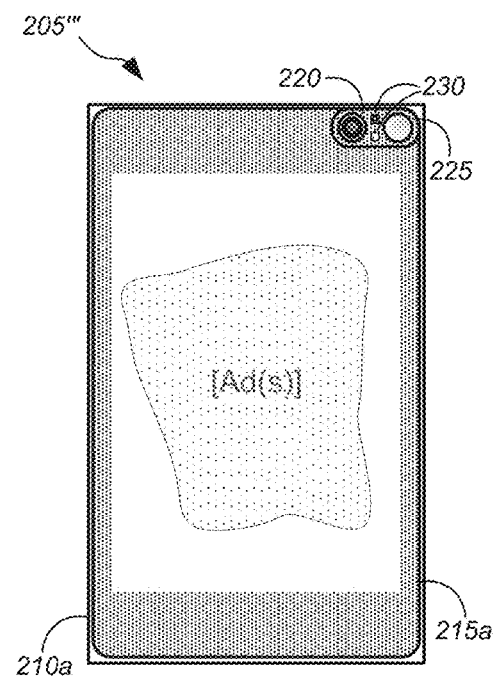

FIGS. 3A-3D (collectively, "FIG. 3") are schematic diagrams illustrating various non-limiting examples 300, 300', 300", and 300''' of content being displayed on a front display screen of a media adaptation device, in accordance with various embodiments. FIG. 3A depicts an embodiment 300 in which media adaptation device 205 comprises a front display device 215a, a front-facing camera(s) 220, and a front light 225 disposed on front face 210a (without sensors 230 on the front face 210a), while hard buttons or physical buttons 255 are disposed on the left side face 210b, and the front display device 215a displays a message to a user indicating that the media adaptation device 205 is ready, and to push a particular button (e.g., the square button, or the like) to take a photo of the wall. FIG. 3B depicts an embodiment 300' in which media adaptation device 205' comprises a front display device 215a disposed on front face 210a, and the front display device 215a displays an image of the wall on which the electrical wall outlet into which the media display device 205' is plugged is disposed. FIG. 3C depicts an embodiment 300" in which media adaptation device 205" comprises a front display device 215a disposed on front face 210a, while hard buttons or physical buttons 255 are disposed on the left side face 210b, and the front display device 215a displays a message to a user indicating that the media adaptation device 205 is implementing WiFi configuration and to push a particular button (e.g., the hexagonal button, or the like) to set up WiFi (along with other steps for setting up WiFi communications). FIG. 3D depicts an embodiment 300''' in which media adaptation device 205''' comprises a front display device 215a, a front-facing camera(s) 220, a front light 225, and sensors 230 disposed on front face 210a, and the front display device 215a displays an advertisement.

Although embodiments 300, 300', 300", and 300''' depict particular configurations of the media adaptation device 205, 205', 205", and 205''' performing particular functions that are depicted on the front display device 215a of each respective device 205, 205', 205", and 205''', the various embodiments are not so limited, and the media adaptation device may have any suitable combination of components—that is, display devices 215 on any suitable face(s) 210; the front-facing camera(s) 220 disposed on any of the front, side, or top faces 210a, 210b, 210c, or 210e; the front light 225 disposed on any of the front, side, or top faces 210a, 210b, 210c, or 210e; the sensors 230 (which might include, but is not limited to, at least one of a light sensor, a proximity sensor, a motion sensor, or an audio sensor, and/or the like); the user interface devices comprising at least one of hard buttons or physical buttons 255 or soft or virtual (touchscreen) buttons 255' on any, some, or all of the front, rear, side, top, or bottom faces 210a-210f; and/or the like. The media adaptation device may also perform at least one of: taking a photograph of the wall; displaying an image of the wall; setting up WiFi configuration; displaying advertisements; performing wireless access point ("WAP") functionality; performing wireless communications functionality; performing Ethernet communications functionality; performing Ethernet over powerline functionality; performing Ethernet over twisted pair functionality; or performing WiFi mesh functionality; and/or the like.

These and other functions of the media adaptation device 205, 205', 205", or 205''' (and its components) are described in greater detail below with respect to FIGS. 1, 2, and 4.

FIGS. 4A-4F (collectively, "FIG. 4") are flow diagrams illustrating a method 400 for implementing media adaptation device functionality, in accordance with various embodiments. Method 400 of FIG. 4A continues onto FIG. 4B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 200', 300, 300', 300", and 300''' of FIGS. 1, 2, and 3, respectively (or components thereof), such methods may also be implemented using any suitable hardware (or software) implementation. Similarly, while each of the systems, examples, or embodiments 100, 200, 200', 300, 300', 300", and 300''' of FIGS. 1, 2, and 3, respectively (or components thereof), can operate according to the method 400 illustrated by FIG. 4 (e.g., by executing instructions embodied on a computer readable medium), the systems, examples, or embodiments 100, 200, 200', 300, 300', 300", and 300''' of FIGS. 1, 2, and 3 can each also operate according to other modes of operation and/or perform other suitable procedures.

Figure 4A:
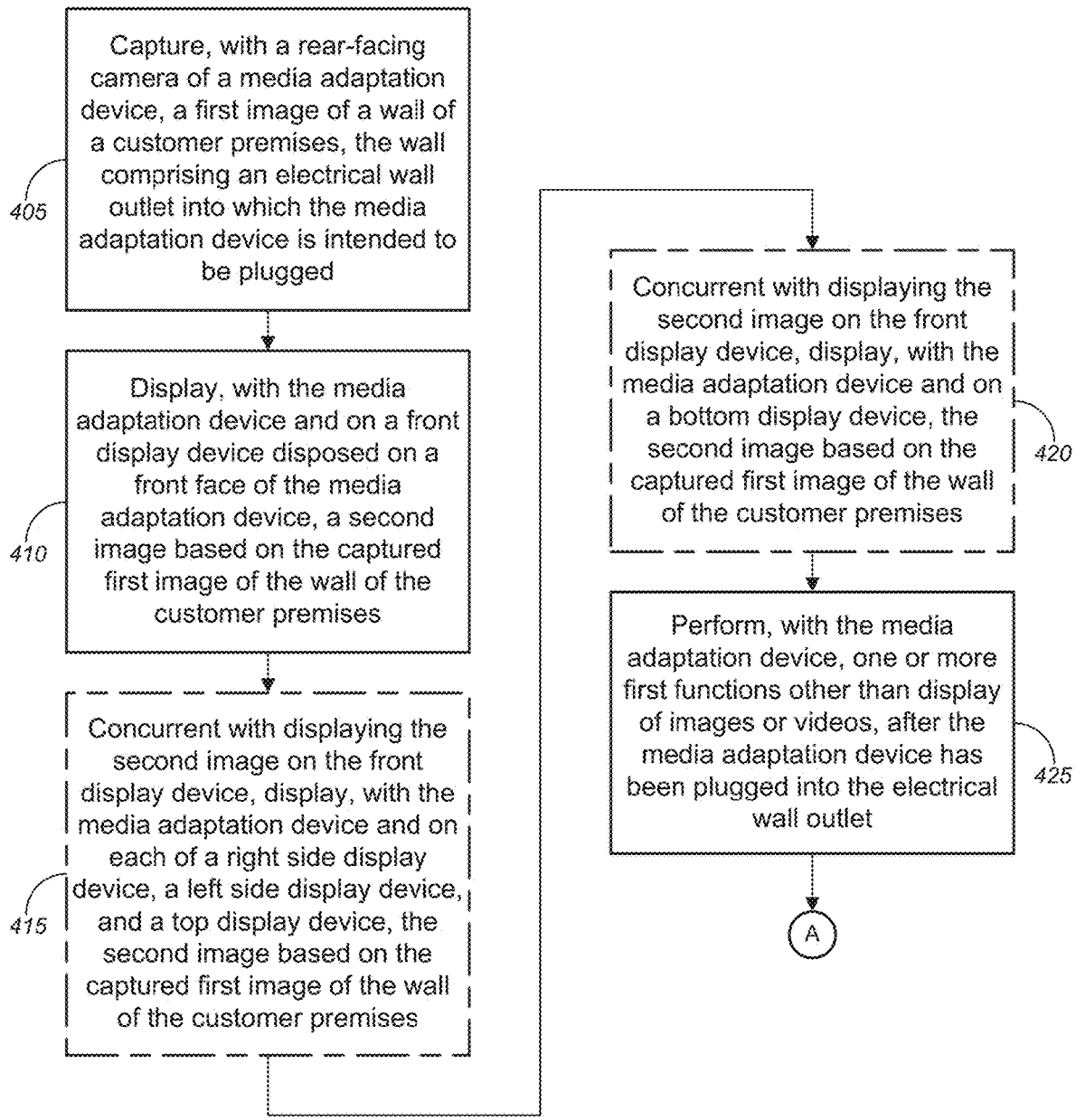

In the non-limiting embodiment of FIG. 4A, method 400, at block 405, might comprise capturing, with a rear-facing camera of a media adaptation device, a first image of a wall of a customer premises, the wall comprising an electrical wall outlet into which the media adaptation device is intended to be plugged. At block 410, method 400 might comprise displaying, with the media adaptation device and on a front display device disposed on a front face of the media adaptation device, a second image based on the captured first image of the wall of the customer premises. In some embodiments, the media adaptation device might further comprise one or more of a right side display device disposed on a right face of the media adaptation device, a left side display device disposed on a left face of the media adaptation device, a top display device disposed on a top face of the media adaptation device, or a bottom display device disposed on a bottom face of the media adaptation device, and/or the like. In such embodiments, method 400 might further comprise concurrent with displaying the second image on the front display device, displaying, with the media adaptation device and on each of the right side display device, the left side display device, and the top display device, the second image based on the captured first image of the wall of the customer premises (optional block 415); and/or concurrent with displaying the second image on the front display device, displaying, with the media adaptation device and on the bottom display device, the second image based on the captured first image of the wall of the customer premises (optional block 420). Method 400 might further comprise, at block 425, performing, with the media adaptation device, one or more first functions other than display of images or videos, after the media adaptation device has been plugged into the electrical wall outlet. Method 400 might continue onto the process at optional block 430 in FIG. 4B following the circular marker denoted, "A."

Figure 4B:
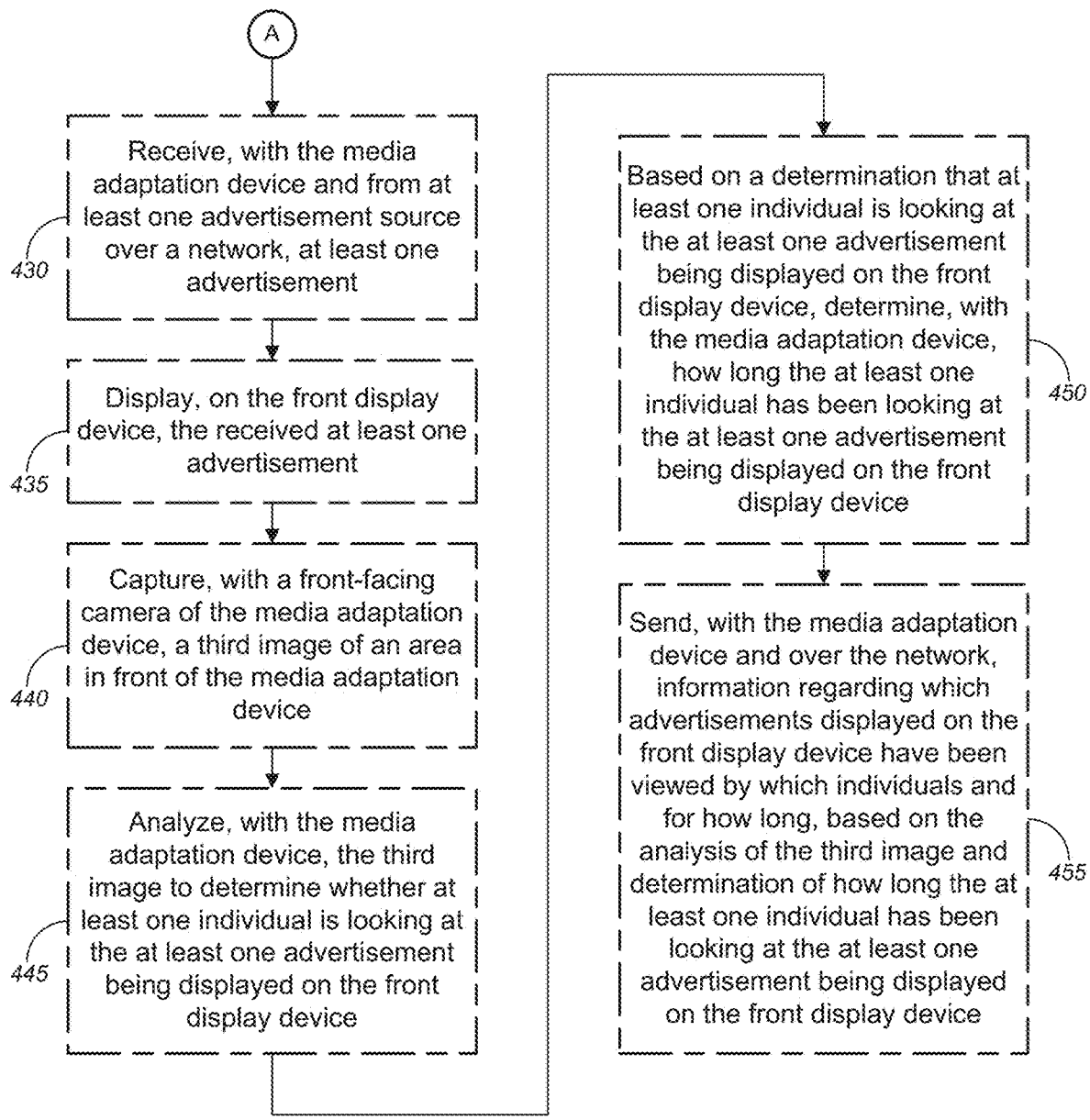

At optional block 430 in FIG. 4B (following the circular marker denoted, "A"), method 400 might comprise receiving, with the media adaptation device and from at least one advertisement source over a network, at least one advertisement. At optional block 435, method 400 might comprise displaying, on the front display device, the received at least one advertisement. Method 400 might further comprise capturing, with a front-facing camera of the media adaptation device, a third image of an area in front of the media adaptation device (optional block 440); and analyzing, with the media adaptation device, the third image to determine whether at least one individual is looking at the at least one advertisement being displayed on the front display device (optional block 445). Method 400, at optional block 450, might comprise, based on a determination that at least one individual is looking at the at least one advertisement being displayed on the front display device, determining, with the media adaptation device, how long the at least one individual has been looking at the at least one advertisement being displayed on the front display device. At optional block 455, method 400 might comprise sending, with the media adaptation device and over the network, information regarding which advertisements displayed on the front display device have been viewed by which individuals and for how long, based on the analysis of the third image and after determination of how long the at least one individual has been looking at the at least one advertisement being displayed on the front display device.

With reference to FIG. 4C, capturing the first image of the wall of the customer premises (at block 405) might comprise determining, with the media adaptation device, whether the wall is sufficiently illuminated based on analysis of one or more temporarily captured images of the wall (block 460). If not, method 400 might proceed to block 465. If so, method 400 might proceed to block 470. Based on a determination that the wall is not sufficiently illuminated, method 400 might comprise shining a light on the wall while capturing the first image of the wall of the customer premises, wherein shining the light on the wall might comprise one of shining a light using a light source disposed on the media adaptation device or displaying a message on the front display device requesting that a user shine a light on the wall (block 465). Based on a determination that the wall is sufficiently illuminated, method 400 might comprise capturing the first image of the wall of the customer premises (block 470).

In some embodiments, the front-facing camera might be isolated from other devices connected to the network regardless of whether or not the media adaptation device is connected to the network. In some cases, images captured by the front-facing camera may be deleted after analysis of the third image and after determination of how long the at least one individual has been looking at the at least one advertisement being displayed on the front display device.

Referring to FIG. 4D, performing the one or more first functions other than display of images or videos (at block 425) might comprise at least one of: performing wireless access point functionality (block 425a); performing wireless communications functionality (block 425b); performing Ethernet communications functionality (block 425c); performing Ethernet over powerline functionality (block 425d);

performing Ethernet over twisted pair functionality (block 425*e*); or performing WiFi mesh functionality (block 425*f*); and/or the like.

According to some embodiments, the media adaptation device might be among a plurality of media adaptation devices that are disposed and plugged into electrical wall outlets located within the customer premises, wherein the media adaptation device and at least one other media adaptation device among the plurality of media adaptation devices might comprise two or more wireless access points. In such embodiments, as shown in FIG. 4E, method 400 might further comprise receiving, with the media adaptation device and from a client device that is associated with a user and that is communicatively coupled wirelessly to the media adaptation device, a query as to which access point among the two or more wireless access points the client device is communicatively coupled wirelessly to (block 475); and sending, with the media adaptation device, a notification to the client device, the notification comprising information regarding the media adaptation device, the information comprising at least one of device identification information associated with the media adaptation device, a symbol associated with the media adaptation device, a user-given nickname associated with the media adaptation device, or a user-selectable color associated with the media adaptation device (block 480).

In alternative embodiments, the media adaptation device might comprise a wireless access point. In such embodiments, with reference to FIG. 4F, method 400 might further comprise, in response to initialization of the media adaptation device or in response to user input indicating resetting of the wireless access point, displaying, with the media adaptation device and on the front display device, one or more wireless configuration steps (block 485); and in response to a user completing the one or more wireless configuration steps displayed on the front display device, configuring the wireless access point of the media adaptation device (block 490).

Exemplary System and Hardware Implementation

Figure 5:
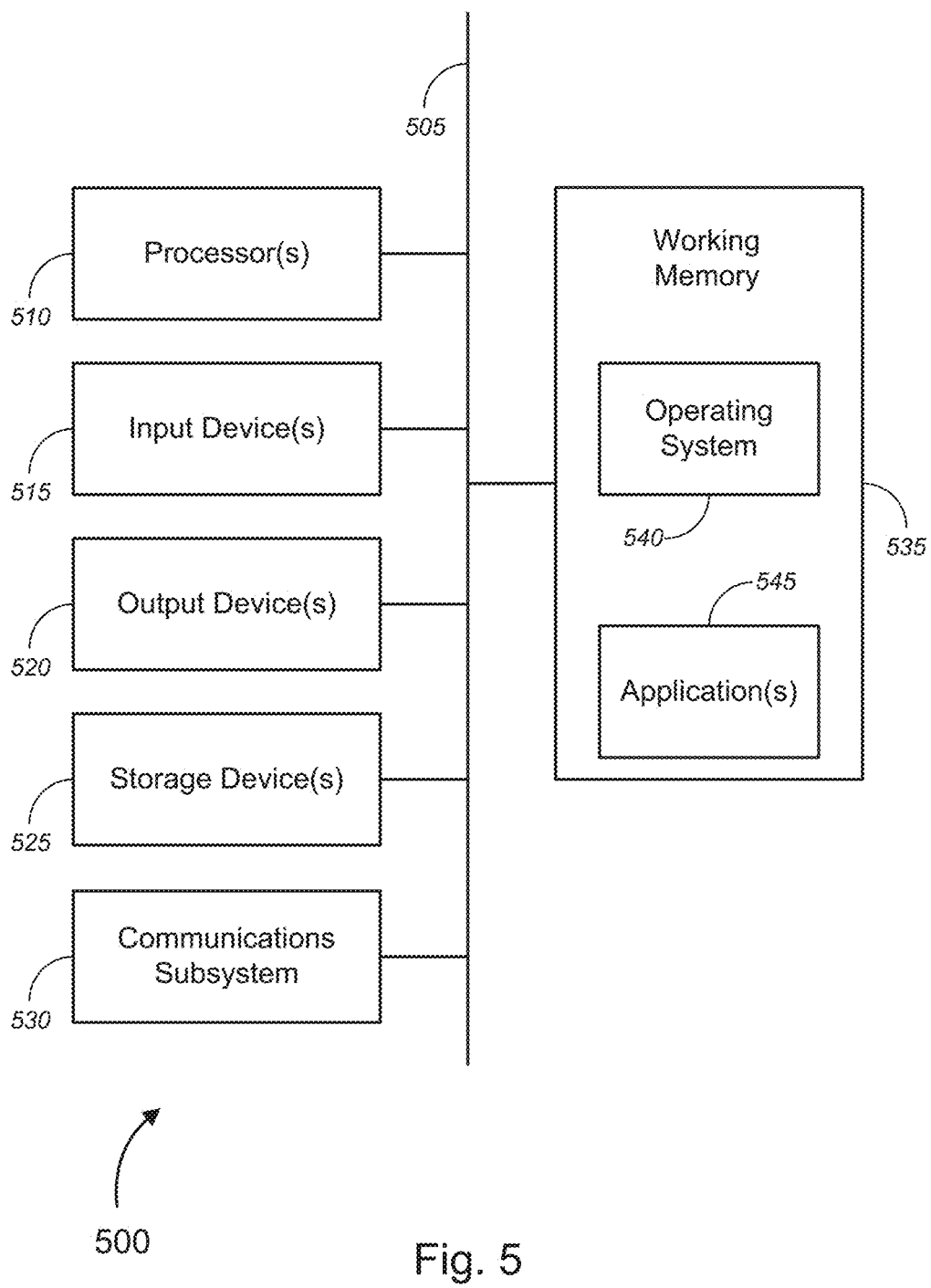
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., media adaptation devices 105, 205, 205', 205", and 205''', user device(s) 115, gateway 120, and computing system 130, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., media adaptation devices 105, 205, 205', 205", and 205''', user device(s) 115, gateway 120, and computing system 130, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
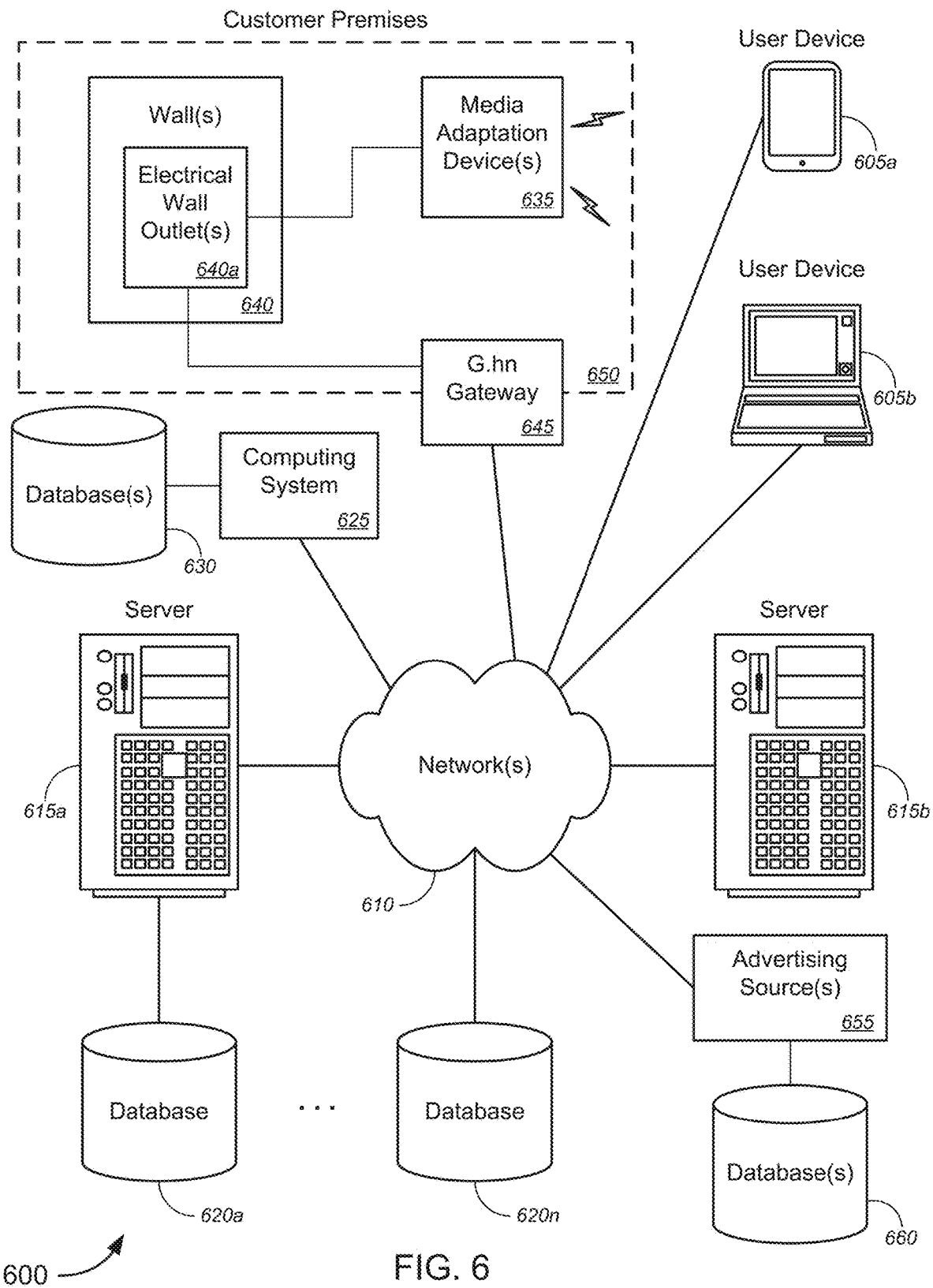
FIG. 6 is a block diagram illustrating a networked system of computers, computing systems, or system hardware architecture, which can be used in accordance with various embodiments.

As noted above, a set of embodiments comprises methods and systems for implementing customer premises device functionality, and, more particularly, to methods, systems, and apparatuses for implementing media adaptation device functionality. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 140 of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing customer premises device functionality, and, more particularly, to methods, systems, and apparatuses for implementing media adaptation device functionality, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing system 130 of FIG. 1, or the like) and corresponding database(s) 630 (similar to database(s) 135 of FIG. 1, or the like). System 600 might further comprise media adaptation device(s) 635 (similar to media adaptation devices 105, 205, 205', 205", and 205'" of FIGS. 1 and 2, or the like), one or more electrical wall outlets 640a (similar to electrical wall outlet(s) 110a of FIG. 1, or the like) disposed on a wall(s) 640 (similar to wall(s) 110 of FIG. 1, or the like) of customer premises 650 (similar to customer premises 650 of FIG. 1, or the like), and a gateway or G.hn gateway 645 (similar to gateway or G.hn gateway 120 of FIG. 1, or the like), each disposed at customer premises 650. System 600 might further comprise advertising source(s) 655 (similar to advertising source(s) 145 of FIG. 1, or the like) and corresponding database(s) 660 (similar to database(s) 150 of FIG. 1, or the like).

In operation, a media adaptation device 635 might capture, using a rear-facing camera(s), a first image of a wall 640 of the customer premises 650. In some cases, the rear-facing camera(s) might be disposed on at least one of a rear face of the media adaptation device 635, a top face of the media adaptation device 635, a bottom face of the media adaptation device 635, and/or a side face of the media adaptation device 635. In some cases, the media adaptation device 635 might be directly plugged into an electrical wall outlet 640a disposed on the wall 640, while the first image is being captured. Alternatively, the media adaptation device 635 might be plugged into the electrical wall outlet 640a disposed on the wall 640 via an extension cord (not shown) connecting the media adaptation device 635 to the electrical wall outlet 640a, while the first image is being captured. In some instances, capturing the first image of the wall 640 of the customer premises 650 might comprise determining, with the media adaptation device 635, whether the wall 640 is sufficiently illuminated based on analysis of one or more temporarily captured images of the wall 640; based on a determination that the wall 640 is not sufficiently illuminated, shining a light on the wall 640 while capturing the first image of the wall 640 of the customer premises 650, wherein shining the light on the wall 640 comprises one of shining a light using a light source (not shown in FIG. 6) disposed on the media adaptation device 635 or displaying a message on a front display device of the media adaptation device 635 requesting that a user shine a light on the wall 640; and based on a determination that the wall 640 is sufficiently illuminated, capturing the first image of the wall 640 of the customer premises 650.

When the media adaptation device 635 is directly plugged into the electrical wall outlet 640a disposed on the wall 640, the media adaptation device 635 might display, on a front display device or display screen that is disposed on a front face of the media adaptation device 635, a second image based on the captured first image of the wall 640 of the customer premises 650. In some cases, the second image being displayed on the front display device might be an exact or precise copy of the first image being captured by the rear-facing camera. Alternatively, the second image might be image-processed by the media adaptation device 635 and/or computing system 625 (via network(s) 610 and gateway 645) to generate an image of the wall 640 that more naturally blends with the color and texture of the wall, while taking into account lighting or shadows (via light sensor data from light sensors among one or more sensors), and/or taking into account color, hue, saturation, and/or contrast characteristics of the rear-facing camera or of the first image captured by the rear-facing camera, or the like. In such cases, the first image might contain image artifacts or the like that when directly displayed on the front display device might not blend smoothly with the color and texture of the wall, and thus image-processing may be necessary to generate the second image to address such image issues. In some cases, the rear-facing camera might continually capture first images while corresponding second images are displayed on the front display device to account for ambient light changes, to account for shadows caused by people or objects crossing in front of the wall 640 and the media adaptation device 635, or to account for other image effects on the wall 640, and/or the like.

In some embodiments, concurrent with displaying the second image on the front display device, the media adaptation device 635 might display, on each of the right side display device, the left side display device, and the top display device, the second image based on the captured first image of the wall 640 of the customer premises 650. In some cases, concurrent with displaying the second image on the front display device, the media adaptation device 635 might further display, on the bottom display device, the second image based on the captured first image of the wall 640 of the customer premises 650.

According to some embodiments, the media adaptation device(s) 635 might display the second image of the wall 640 as a default setting, while displaying advertisements or messages on the front display device or display screen (and perhaps also on the top and/or side display devices or display screens disposed on corresponding top and/or side faces of the media adaptation device(s) 635) when the media adaptation device(s) 635 detects via one or more sensors (including, but not limited to, a proximity sensor, a motion sensor, and/or the like), or the like. In such cases, the media adaptation device(s) 635 might receive at least one advertisement from the advertising source(s) 655 and corresponding database(s) 660, via network(s) 610, via gateway 645, and via electrical wall outlet(s) 640a. The media adaptation device 635 might display the received at least one advertisement on the front display device (and perhaps also on the top and/or side display devices or display screens disposed on corresponding top and/or side faces of the media adaptation device(s) 635). The media adaptation device 635 might capture, with a front-facing camera, a third image of an area in front of the media adaptation device. The media adaptation device 635 (and/or the computing system 625) might analyze the third image to determine whether at least one individual is looking at the at least one advertisement being displayed on the front display device. Based on a determination that at least one individual is looking at the at least one advertisement being displayed on the front display device, the media adaptation device 635 (and/or the computing system 625) might determine how long the at least one individual has been looking at the at least one advertisement being displayed on the front display device. The media adaptation device 635 might send, over the network(s) 610, information regarding which advertisements displayed on the front display device have been viewed by which individuals and for how long, based on the analysis of the third image and after determination of how long the at least one individual has been looking at the at least one advertisement being displayed on the front display device.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
capturing, with a rear-facing camera of a media adaptation device, a first image of a wall of a customer premises, the wall comprising an electrical wall outlet into which the media adaptation device is intended to be plugged;
displaying, with the media adaptation device and on a front display device disposed on a front face of the media adaptation device, a second image based on the captured first image of the wall of the customer premises; and
performing, with the media adaptation device, one or more first functions other than display of images or videos, after the media adaptation device has been plugged into the electrical wall outlet,
wherein the media adaptation device further comprises a right side display device disposed on a right face of the media adaptation device, a left side display device disposed on a left face of the media adaptation device, and a top display device disposed on a top face of the media adaptation device, wherein the method further comprises: concurrent with displaying the second image on the front display device, displaying, with the media adaptation device and on each of the right side display device, the left side display device, and the top display device, the second image based on the captured first image of the wall of the customer premises,
or
wherein the media adaptation device further comprises a bottom display device disposed on a bottom face of the media adaptation device, wherein the method further comprises:
concurrent with displaying the second image on the front display device, displaying, with the media adaptation device and on the bottom display device, the second image based on the captured first image of the wall of the customer premises.

2. The method of claim 1, wherein capturing the first image of the wall of the customer premises comprises:
determining, with the media adaptation device, whether the wall is sufficiently illuminated based on analysis of one or more temporarily captured images of the wall;
based on a determination that the wall is not sufficiently illuminated, shining a light on the wall while capturing the first image of the wall of the customer premises, wherein shining the light on the wall comprises one of shining a light using a light source disposed on the media adaptation device or displaying a message on the front display device requesting that a user shine a light on the wall; and
based on a determination that the wall is sufficiently illuminated, capturing the first image of the wall of the customer premises.

3. The method of claim 1, further comprising:
receiving, with the media adaptation device and from at least one advertisement source over a network, at least one advertisement;
displaying, on the front display device, the received at least one advertisement;
capturing, with a front-facing camera of the media adaptation device, a third image of an area in front of the media adaptation device;
analyzing, with the media adaptation device, the third image to determine whether at least one individual is looking at the at least one advertisement being displayed on the front display device;
based on a determination that at least one individual is looking at the at least one advertisement being displayed on the front display device, determining, with the media adaptation device, how long the at least one individual has been looking at the at least one advertisement being displayed on the front display device; and
sending, with the media adaptation device and over the network, information regarding which advertisements displayed on the front display device have been viewed by which individuals and for how long, based on the analysis of the third image and after determination of how long the at least one individual has been looking at the at least one advertisement being displayed on the front display device.

4. The method of claim 3, wherein the front-facing camera is isolated from other devices connected to the network regardless of whether or not the media adaptation device is connected to the network.

5. The method of claim 3, wherein images captured by the front-facing camera are deleted after analysis of the third image and after determination of how long the at least one individual has been looking at the at least one advertisement being displayed on the front display device.

6. The method of claim 1, wherein performing the one or more first functions other than display of images or videos comprises at least one of:
performing wireless access point functionality;
performing wireless communications functionality;
performing Ethernet communications functionality;
performing Ethernet over powerline functionality;
performing Ethernet over twisted pair functionality; or
performing WiFi mesh functionality.

7. The method of claim 1, wherein the media adaptation device is among a plurality of media adaptation devices that are disposed and plugged into electrical wall outlets located within the customer premises, wherein the media adaptation device and at least one other media adaptation device among the plurality of media adaptation devices comprise two or more wireless access points, wherein the method further comprises:
receiving, with the media adaptation device and from a client device that is associated with a user and that is communicatively coupled wirelessly to the media adaptation device, a query as to which access point among the two or more wireless access points the client device is communicatively coupled wirelessly to; and
sending, with the media adaptation device, a notification to the client device, the notification comprising information regarding the media adaptation device, the information comprising at least one of device identification information associated with the media adaptation device, a symbol associated with the media adaptation device, a user-given nickname associated with the media adaptation device, or a user-selectable color associated with the media adaptation device.

8. The method of claim 1, wherein the media adaptation device comprises a wireless access point, wherein the method further comprises:

in response to initialization of the media adaptation device or in response to user input indicating resetting of the wireless access point, displaying, with the media adaptation device and on the front display device, one or more wireless configuration steps; and in response to a user completing the one or more wireless configuration steps displayed on the front display device, configuring the wireless access point of the media adaptation device.

9. A media adaptation device, comprising:

a rear-facing camera;

a front display device disposed on a front face of the media adaptation device;

at least one processor; and a non-transitory computer readable medium communicatively coupled to the at least one processor, the non-transitory computer readable medium having stored thereon computer software comprising a set of instructions that, when executed by the at least one processor, causes the media adaptation device to:

capture, with the rear-facing camera, a first image of a wall of a customer premises, the wall comprising an electrical wall outlet into which the media adaptation device is intended to be plugged;

display, on the front display device, a second image based on the captured first image of the wall of the customer premises; and perform one or more first functions other than display of images or videos, after the media adaptation device has been plugged into the electrical wall outlet, wherein the media adaptation device further comprises a right side display device disposed on a right face of the media adaptation device, a left side display device disposed on a left face of the media adaptation device, and a top display device disposed on a top face of the media adaptation device, wherein the set of instructions, when executed by the at least one processor, further causes the media adaptation device to:

concurrent with displaying the second image on the front display device, display, on each of the right side display device, the left side display device, and the top display device, the second image based on the captured first image of the wall of the customer premises, or wherein the media adaptation device further comprises a bottom display device disposed on a bottom face of the media adaptation device, wherein the set of instructions, when executed by the at least one processor, further causes the media adaptation device to:

concurrent with displaying the second image on the front display device, display, on the bottom display device, the second image based on the captured first image of the wall of the customer premises.

10. The media adaptation device of claim 9, wherein capturing the first image of the wall of the customer premises comprises:

determining whether the wall is sufficiently illuminated based on analysis of one or more temporarily captured images of the wall;

based on a determination that the wall is not sufficiently illuminated, shining a light on the wall while capturing the first image of the wall of the customer premises, wherein shining the light on the wall comprises one of shining a light using a light source disposed on the media adaptation device or displaying a message on the front display device requesting that a user shine a light on the wall; and based on a determination that the wall is sufficiently illuminated, capturing the first image of the wall of the customer premises.

11. The media adaptation device of claim 9, further comprising a front-facing camera, wherein the set of instructions, when executed by the at least one processor, further causes the media adaptation device to:

receive, from at least one advertisement source over a network, at least one advertisement;

display, on the front display device, the received at least one advertisement;

capture, with the front-facing camera, a third image of an area in front of the media adaptation device;

analyze the third image to determine whether at least one individual is looking at the at least one advertisement being displayed on the front display device;

based on a determination that at least one individual is looking at the at least one advertisement being displayed on the front display device, determine how long the at least one individual has been looking at the at least one advertisement being displayed on the front display device; and send, over the network, information regarding which advertisements displayed on the front display device have been viewed by which individuals and for how long, based on the analysis of the third image and after determination of how long the at least one individual has been looking at the at least one advertisement being displayed on the front display device.

12. The media adaptation device of claim 9, wherein performing the one or more first functions other than display of images or videos comprises at least one of:

performing wireless access point functionality;
performing wireless communications functionality;
performing Ethernet communications functionality;
performing Ethernet over powerline functionality;
performing Ethernet over twisted pair functionality; or
performing WiFi mesh functionality.

13. The media adaptation device of claim 9, wherein the media adaptation device is among a plurality of media adaptation devices that are disposed and plugged into electrical wall outlets located within the customer premises, wherein the media adaptation device and at least one other media adaptation device among the plurality of media adaptation devices comprise two or more wireless access points, wherein the set of instructions, when executed by the at least one processor, further causes the media adaptation device to:

receive, from a client device that is associated with a user and that is communicatively coupled wirelessly to the media adaptation device, a query as to which access point among the two or more wireless access points the client device is communicatively coupled wirelessly to; and send a notification to the client device, the notification comprising information regarding the media adaptation device, the information comprising at least one of device identification information associated with the media adaptation device, a symbol associated with the media adaptation device, a user-given nickname associated with the media adaptation device, or a user-selectable color associated with the media adaptation device.

14. The media adaptation device of claim 9, wherein the media adaptation device comprises a wireless access point, wherein the set of instructions, when executed by the at least one processor, further causes the media adaptation device to:
- in response to initialization of the media adaptation device or in response to user input indicating resetting of the wireless access point, display, on the front display device, one or more wireless configuration steps; and
- in response to a user completing the one or more wireless configuration steps displayed on the front display device, configure the wireless access point of the media adaptation device.

15. The media adaptation device of claim 9, wherein a front facing camera is disposed on at least one of the front face of the media adaptation device, a top face of the media adaptation device, or a side face of the media adaptation device, wherein the rear facing camera is disposed on at least one of the rear face of the media adaptation device, the top face of the media adaptation device, a bottom face of the media adaptation device, or the side face of the media adaptation device.

16. The media adaptation device of claim 9, further comprising a user interface device, wherein the user interface device comprises at least one of one or more physical buttons or one or more touchscreen buttons, wherein the one or more physical buttons are disposed on at least one of a top face of the media adaptation device, a left side face of the media adaptation device, or a right side face of the media adaptation device, wherein the one or more touchscreen buttons are disposed on at least one of the front face, the top face, the left side face, or the right side face.

\* \* \* \* \*